US012774792B2

(12) United States Patent
Chande et al.

(10) Patent No.: US 12,774,792 B2
(45) Date of Patent: Oct. 27, 2026

(54) VARIABLY SWITCHED UNIFORM AND STRIPED LIGHTING PANEL

(71) Applicant: Fyusion, Inc., San Francisco, CA (US)

(72) Inventors: Krunal Ketan Chande, San Francisco, CA (US); Stefan Johannes Josef Holzer, San Mateo, CA (US); Matteo Munaro, San Francisco, CA (US); Rodrigo Ortiz-Cayon, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 18/927,780

(22) Filed: Oct. 25, 2024

(65) Prior Publication Data

US 2026/0117948 A1 Apr. 30, 2026

(51) Int. Cl.

| | |
|---|---|
| ***F21S 8/00*** | (2006.01) |
| ***F21V 11/02*** | (2006.01) |
| ***G01B 11/25*** | (2006.01) |
| ***G01N 21/88*** | (2006.01) |
| ***G01N 21/95*** | (2006.01) |
| ***H05B 47/17*** | (2020.01) |
| *F21Y 107/10* | (2016.01) |

(Continued)

(52) U.S. Cl.
CPC ............... *F21S 8/032* (2013.01); *F21V 11/02* (2013.01); *G01B 11/254* (2013.01); *G01N 21/8806* (2013.01); *G01N 21/8851* (2013.01); *G01N 21/9515* (2013.01); *H05B 47/17* (2020.01); *F21Y 2107/10* (2016.08); *F21Y 2113/10* (2016.08); *F21Y 2115/10* (2016.08); *G01N 2021/8829* (2013.01); *G01N 2021/887* (2013.01); *G01N 2021/889* (2013.01); *G01N 2201/062* (2013.01)

(58) Field of Classification Search
CPC .......... H05B 47/17; F21V 11/02; F21S 8/032; G01B 11/254; G01N 21/8806; G01N 21/8851; G01N 21/9515
See application file for complete search history.

(56) References Cited

U.S. PATENT DOCUMENTS

| | | | |
|---|---|---|---|
| 5,436,726 | A | 7/1995 | Ventura et al. |
| 5,572,324 | A | 11/1996 | Ventura |
| 5,675,417 | A | 10/1997 | Ventura et al. |

(Continued)

FOREIGN PATENT DOCUMENTS

| | | | |
|---|---|---|---|
| CN | 206945520 | U | 1/2018 |
| CN | 113109346 | A | 7/2021 |

(Continued)

*Primary Examiner* — Gerald J Sufleta, II
(74) *Attorney, Agent, or Firm* — Kwan & Olynick LLP

(57) ABSTRACT

According to various embodiments, a variably switched striped lighting pattern panel is provided. A panel may include numerous rows of light emitting diodes (LEDs). Alternating rows are controlled separately by a microcontroller so that a first set can be switched on while a second set switched off to provide striped lighting. On the other hand, both sets can be switched on to provide for uniform lighting. Barriers may be provided between the rows of LEDs while a diffuser is placed in front of the LEDs. The variably switched striped lighting pattern panels can be used in a vehicle tunnel in a variety of configurations to allow for vehicle image capture in varying conditions for damage assessment.

15 Claims, 21 Drawing Sheets

(51) Int. Cl.
*F21Y 113/10* (2016.01)
*F21Y 115/10* (2016.01)

(56) References Cited

U.S. PATENT DOCUMENTS

| | | | | |
|---|---|---|---|---|
| 5,726,705 | A * | 3/1998 | Imanishi | G01N 21/8806 356/600 |
| 11,021,885 | B2 | 6/2021 | Williams | |
| 12,208,730 | B1 * | 1/2025 | Schumacher | G01S 17/931 |
| 2016/0061744 | A1 | 3/2016 | Krebber et al. | |
| 2024/0257445 | A1 * | 8/2024 | Holzer | G06F 9/453 |
| 2024/0375619 | A1 * | 11/2024 | Nichols | B60S 3/04 |
| 2025/0086771 | A1 * | 3/2025 | Amouie | B61L 25/021 |

FOREIGN PATENT DOCUMENTS

| | | | |
|---|---|---|---|
| CN | 117664986 | A | 3/2024 |
| DE | 102005034637 | A1 | 10/2006 |
| DE | 102016105009 | A1 | 9/2017 |
| JP | H11132964 | A | 5/1999 |
| JP | 2002116015 | A | 4/2002 |
| JP | 2016523724 | A | 8/2016 |
| KR | 200365661 | Y1 | 10/2004 |
| KR | 20130005295 | U | 9/2013 |

* cited by examiner

VARIABLY SWITCHED UNIFORM AND STRIPED LIGHTING PANEL

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure generally relates to vehicle damage detection, and more specifically to variably switched uniform and striped lighting panels.

DESCRIPTION OF RELATED ART

Objects such as motor vehicles require inspection for damage in a variety of situations. For example, a vehicle may be inspected after an accident to evaluate or support an insurance claim or police report. In another example, a vehicle may be inspected before and after the rental of a vehicle, or before buying or selling a vehicle.

Vehicle inspection using conventional approaches has a variety of drawbacks. Typically, a person walks around the vehicle and manually notes damage and conditions. This process can be resource intensive, resulting in significant costs. The manual inspection results also vary based on the person. For example, a person may be more or less experienced in evaluating damage. The variation in results can yield a lack of trust and potential financial losses, for example when buying and selling vehicles or when evaluating insurance claims.

OVERVIEW

According to various embodiments, a variably switched striped lighting pattern panel is provided. A panel may include numerous rows of light emitting diodes (LEDs). Alternating rows are controlled separately by a microcontroller so that a first set can be switched on while a second set switched off to provide striped lighting. On the other hand, both sets can be switched on to provide for uniform lighting. Barriers may be provided between the rows of LEDs while a diffuser is placed in front of the LEDs. The variably switched striped lighting pattern panels can be used in a vehicle tunnel in a variety of configurations to allow for vehicle image capture in varying conditions for damage assessment.

In some aspects, the techniques described herein relate to a vehicle tunnel, including: a vehicle tunnel entrance area; a vehicle tunnel exit area; a plurality of cameras configured to capture images of a vehicle passing through the vehicle tunnel; and a variably switched lighting panel including: a plurality of light emitting diodes (LEDs) in striped format, the plurality of LEDs including a first plurality of LEDs and a second plurality of LEDs in alternating rows; a microcontroller operable to control the first plurality of LEDs and the second plurality of LEDS in multiple modes including a first mode when the first plurality of LEDs and the second plurality of LEDs are both on and a second mode when the first plurality of LEDs are on and the second plurality of LEDs are off; a diffuser placed in front of the LEDs to emit more uniform lighting from the variably switched lighting panel; and a plurality of lighting barriers between the first plurality of LEDs and the second plurality of LEDs, so that a plurality of stripes are dark when particular rows of LEDs are off; wherein the plurality of cameras are configured to capture a first plurality of vehicle surface images when illuminated by the variably switched lighting panel, wherein the first plurality of vehicle surface images are analyzed to detect vehicle imperfections.

In some aspects, the techniques described herein relate to a vehicle tunnel, wherein the microcontroller is operable to control the first plurality of LEDS and the second plurality of LEDS in a third mode when the first plurality of LEDS and the second plurality of LEDS are both off.

In some aspects, the techniques described herein relate to a vehicle tunnel, wherein the plurality of lighting barriers are opaque lighting barriers separating strips of LEDS.

In some aspects, the techniques described herein relate to a vehicle tunnel, wherein the first plurality of LEDS and the second plurality of LEDS are switched to selected colors to contrast against a color of the vehicle.

In some aspects, the techniques described herein relate to a vehicle tunnel, wherein the first plurality of LEDS is selected to be a complementary color to the color of the vehicle.

In some aspects, the techniques described herein relate to a vehicle tunnel, wherein images captured are used to generate a Multiview Interactive Digital Media Representation (MVIDMR).

In some aspects, the techniques described herein relate to a vehicle tunnel, wherein a plurality of MVIDMRs are generated for a plurality of different components of the vehicle.

In some aspects, the techniques described herein relate to a vehicle tunnel, wherein each of the plurality of MVIDMRs is user navigable along at least two different axes.

In some aspects, the techniques described herein relate to a vehicle tunnel, wherein the plurality of MVIDMRs are generated for a plurality of vehicle components including damaged components.

In some aspects, the techniques described herein relate to a vehicle tunnel, wherein the damaged components are navigable along at least two different axes.

In some aspects, the techniques described herein relate to a vehicle tunnel, wherein images illuminated by the variably switched lighting panel operating in a uniform lighting panel mode are used to detect damage to a first component of the vehicle.

In some aspects, the techniques described herein relate to a vehicle tunnel, wherein images illuminated by the variably switched lighting panel operating in a striped lighting panel mode are used to analyze an extent of damage to the first component of the vehicle.

In some aspects, the techniques described herein relate to a vehicle tunnel, wherein capture of additional images is triggered if damage is detected.

In some aspects, the techniques described herein relate to a vehicle tunnel, wherein the variably switched lighting panel includes a plurality of strips of color LEDs operating in a plurality of modes.

In some aspects, the techniques described herein relate to a vehicle tunnel, wherein the variably switched lighting panel includes a plurality of strips of color LEDs operating in a plurality of modes including an all on mode, an all off mode, and a striped mode.

In some aspects, the techniques described herein relate to a variably switched lighting panel, including: a plurality of light emitting diodes (LEDs) in striped format, the plurality of LEDs including a first plurality of LEDs and a second plurality of LEDs in alternating rows; a microcontroller operable to control the first plurality of LEDs and the second plurality of LEDS in multiple modes including a first mode when the first plurality of LEDs and the second plurality of LEDs are both on and a second mode when the first plurality of LEDs are on and the second plurality of LEDs are off; a diffuser placed in front of the LEDs to emit more uniform lighting from the variably switched light panel; and a plurality of lighting barriers between the first plurality of LEDs and the second plurality of LEDs, so that a plurality of stripes are dark when particular rows of LEDs are off; wherein a plurality of cameras are configured to capture a first plurality of object surface images when illuminated by the variably switched lighting panels, wherein the first plurality of object surface images are analyzed to detect object imperfections.

In some aspects, the techniques described herein relate to a variably switched lighting panel, wherein the microcontroller is operable to control the first plurality of LEDS and the second plurality of LEDS in a third mode when the first plurality of LEDS and the second plurality of LEDS are both off.

In some aspects, the techniques described herein relate to a variably switched lighting panel, wherein the plurality of lighting barriers are opaque lighting barriers separating strips of LEDS.

In some aspects, the techniques described herein relate to a variably switched lighting panel, wherein the first plurality of LEDS and the second plurality of LEDS are switched to selected colors to contrast against a color of the object.

In some aspects, the techniques described herein relate to a variably switched lighting panel, wherein the first plurality of LEDS is selected to be a complementary color to the color of the object.

BRIEF DESCRIPTION OF THE DRAWINGS

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

DETAILED DESCRIPTION

According to various embodiments, techniques and mechanisms described herein may be used to identify and represent damage to an object such as a vehicle using a structure such as a vehicle tunnel. The damage detection techniques may be employed by untrained individuals. For example, an individual may collect multi-view data of an object, and the system may detect the damage automatically.

According to various embodiments, various types of damage may be detected. For a vehicle, such data may include, but is not limited to: scratches, dents, flat tires, cracked glass, broken glass, or other such damage. The vehicle tunnel may be constructed of various materials including lighting panels themselves, frames including lighting sources, a filter or screen for managing lighting exterior to a tunnel, etc. Alternatively, the lighting pattern panels may correspond to an interior surface of the vehicle tunnel, e.g. may form the interior surface, be located in the interior side, or compose the vehicle tunnel itself.

According to various embodiments, various methods and systems described herein may be used to create damage estimates that are consistent over multiple captures. In this way, damage estimates may be constructed in a manner that is independent of the individual wielding the camera and does not depend on the individual's expertise. In this way, the system can automatically detect damage in an instant, without requiring human intervention.

Although various techniques and mechanisms are described herein by way of example with reference to detecting damage to vehicles, these techniques and mechanisms are widely applicable to detecting damage to a range of objects using a variety of differing structures. Such objects may include, but are not limited to: houses, apartments, hotel rooms, real property, personal property, equipment, jewelry, furniture, offices, people, and animals.

Figure 1:
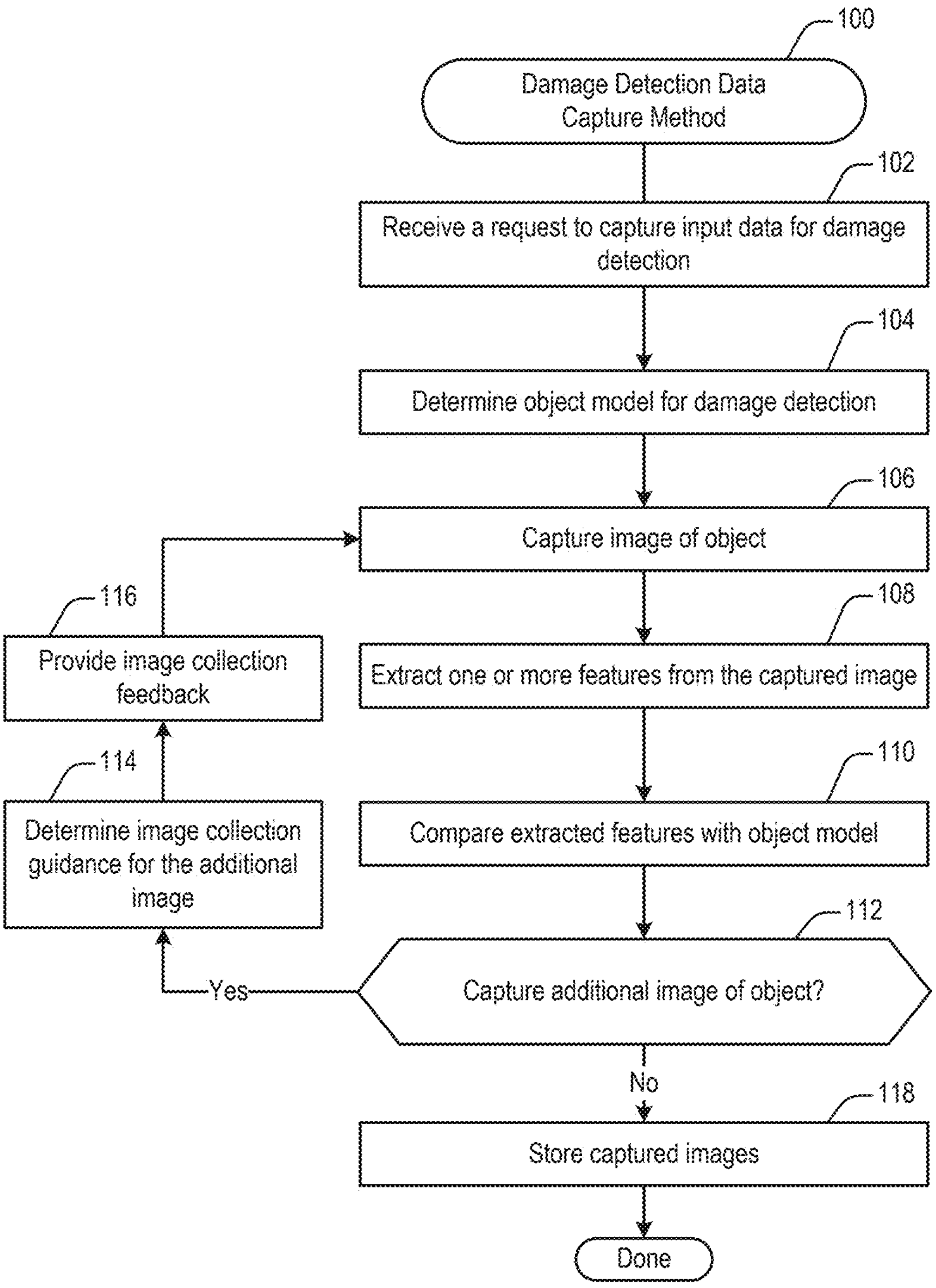
FIG. 1 illustrates one example of a damage detection data capture method, performed in accordance with various embodiments.

FIG. 1 illustrates one example of a technique for damage detection data capture. According to various embodiments, the technique 100 may be performed at a vehicle tunnel having multiple cameras. The cameras may be in communication with a remote server. The technique 100 may be used to detect damage to any of various types of objects. However, for the purpose of illustration, many examples discussed herein will be described with reference to vehicles.

A request to capture input data for damage detection for an object is received at 102. In some implementations, the request to capture input data may be received at a multiple cameras or multiple computing devices included in a vehicle tunnel. In particular embodiments, the object may be a vehicle such as a car, truck, or sports utility vehicle.

An object model for damage detection is determined at 104. According to various embodiments, the object model may include reference data for use in evaluating damage and/or collecting images of an object. For example, the object model may include one or more reference images of similar objects for comparison. As another example, the object model may include a trained neural network. As yet another example, the object model may include one or more reference images of the same object captured at an earlier point in time or at particular points during the vehicle tunnel image capture process. As yet another example, the object model may include a 3D model (such as a CAD model) or a 3D mesh reconstruction of the corresponding vehicle.

In some embodiments, the object model may be determined based on user input. For example, the user may identify a vehicle in general or a car, truck, or sports utility vehicle in particular as the object type.

In some implementations, the object model may be determined automatically based on data captured as part of the technique 100. In this case, the object model may be determined after the capturing of one or more images at 106.

At 106, an image of the object is captured. According to various embodiments, capturing the image of the object may involve receiving data from one or more of various sensors. Such sensors may include, but are not limited to, one or more cameras, depth sensors, accelerometers, and/or gyroscopes. The sensor data may include, but is not limited to, visual data, motion data, and/or orientation data. In some configurations, more than one image of the object may be captured. Alternatively, or additionally, video footage may be captured.

According to various embodiments, a camera or other sensor located at a computing device may be communicably coupled with the computing device in any of various ways. For example, in the case of a mobile phone or laptop, the camera may be physically located within the computing device. As another example, in some configurations a camera or other sensor may be connected to the computing device via a cable. As still another example, a camera or other sensor may be in communication with the computing device via a wired or wireless communication link.

According to various embodiments, as used herein the term “depth sensor” may be used to refer to any of a variety of sensor types that may be used to determine depth information. For example, a depth sensor may include a projector and camera operating in infrared light frequencies. As another example, a depth sensor may include a projector and camera operating in visible light frequencies. For instance, a line-laser or light pattern projector may project a visible light pattern onto an object or surface, which may then be detected by a visible light camera.

One or more features of the captured image or images are extracted at 108. In some implementations, extracting one or more features of the object may involve constructing a multi-view capture that presents the object from different viewpoints. If a multi-view capture has already been constructed, then the multi-view capture may be updated based on the new image or images captured at 106. Alternatively, or additionally, feature extraction may involve performing one or more operations such as object recognition, component identification, orientation detection, or other such steps.

At 110, the extracted features are compared with the object model. According to various embodiments, comparing the extracted features to the object model may involve making any comparison suitable for determining whether the captured image or images are sufficient for performing damage comparison. Such operations may include, but are not limited to: applying a neural network to the captured image or images, comparing the captured image or images to one or more reference images, and/or performing any of the operations discussed with respect to FIGS. 8 and 9.

A determination is made at 112 as to whether to capture an additional image of the object. In some implementations, the determination may be made at least in part based on an analysis of the one or more images that have already been captured. In some embodiments, a preliminary damage analysis may be implemented using as input the one or more images that have been captured. If the damage analysis is inconclusive, then an additional image may be captured. Techniques for conducting damage analysis are discussed in additional detail with respect to the techniques 800 and 900 shown in FIGS. 8 and 9.

In some embodiments, the system may analyze the captured image or images to determine whether a sufficient portion of the object has been captured in sufficient detail to support damage analysis. For example, the system may analyze the captured image or images to determine whether the object is depicted from all sides. As another example, the system may analyze the capture image or images to determine whether each panel or portion of the object is shown in a sufficient amount of detail. As yet another example, the system may analyze the capture image or images to determine whether each panel or portion of the object is shown from a sufficient number of viewpoints to assess camera placement in a vehicle tunnel.

If the determination is made to capture an additional image, then at 114 image collection guidance for capturing the additional image is determined. In some implementations, the image collection guidance may include any suitable instructions for capturing an additional image that may assist in changing the determination made at 112. Such guidance may include an indication to capture an additional image from a targeted viewpoint, to place additional cameras, to configure the existing cameras differently, to drive the vehicle through the vehicle tunnel in a different manner, to capture an additional image of a designated portion of the object, or to capture an additional image at a different level of clarity or detail. For example, if possible damage is detected, then feedback may be provided to capture additional detail at the damaged location. At 116, image collection feedback is provided. At 118, captured images are stored.

Various embodiments of the present invention recognize that existing mechanisms for damage detection and assessment have a variety of drawbacks. In some instances, lighting for capture of images for damage assessment in vehicle tunnels may be insufficient or otherwise not ideal. A variety of types of surfaces, coatings, and materials may also render appropriate image capture difficult. In many instances, smaller imperfections such as small dents or dings may be imperceptible to the human eye or existing image capture mechanisms. Consequently, various embodiments of the present invention provide improved damage assessment mechanisms.

Figure 2A:
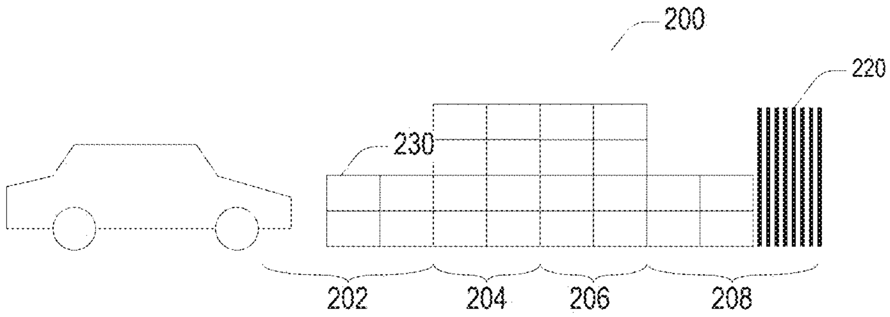
FIGS. 2A-2D illustrate examples of a striped lighting pattern panel vehicle tunnel for damage detection data capture.

According to various embodiments, a striped lighting vehicle tunnel is provided. FIGS. 2A-2D show examples of vehicle tunnels having striped lighting. FIG. 2A shows a vehicle tunnel 200 that a vehicle may move through either manually or automatically. The vehicle tunnel 200 includes a vehicle tunnel entrance area 202 that a vehicle enters. The vehicle tunnel further includes vehicle tunnel midsection including vehicle tunnel midsections 204 and 206. In particular embodiments, the vehicle tunnel also includes a vehicle tunnel exit area 208. Each of the vehicle tunnel entrance area 202, vehicle tunnel midsections 204 and 206, as well as vehicle tunnel exit area 208 may include uniform lighting pattern panels 230. According to various embodiments, the entire vehicle tunnel 200 is constructed of uniform lighting pattern panels 230. In particular embodiments, uniform lighting pattern panels refers to a type of lighting system that provides even and consistent illumination across a surface or object. These panels, can be made with LEDs and a diffuser, and may be designed to distribute light uniformly over a large area, reducing glare and shadows. In some examples, these uniform lighting pattern panels include the lighting source themselves. In other examples, the uniform lighting pattern panels are merely diffusers that distribute light from an external source.

According to various embodiments, images captured by the uniform lighting pattern panels are used to create a model of the vehicle. In particular embodiments, images captured by the uniform lighting pattern panels are used to detect damage. If damage is detected, it may trigger striped lighting pattern panels to captured even more images than usual in order to more accurately assess the extent of any damage or imperfections. Alternatively, detecting damage may also trigger a request to have the vehicle pass through the lighting tunnel again, with lighting tuned to a different intensity, cameras adjusted in position, frame rates changed, etc. If no damage is detected using the uniform lighting pattern panels, a standard amount of images may be captured when vehicle components are illuminated by striped lighting pattern panels.

In particular embodiments, striped lighting pattern panels 220 are placed in vehicle tunnel exit area 208. According to various embodiments, the striped lighting panels may produce the lighting themselves. Alternatively, they may operate as a screen or filter to pass background produced light through in a manner that generates striped lighting. According to various embodiments, striped lighting panels are useful for inspecting surface imperfections or damage on a vehicle's body. These panels may include lights that project alternating bright and dark stripes onto the car's surface, creating a high-contrast pattern. When the striped pattern is reflected off a smooth surface, the lines appear straight. However, if there are dents, dings, or surface irregularities, the stripes become distorted, highlighting vehicle imperfections. According to various embodiments, the techniques of the present invention have identified locations particularly suitable for striped lighting projection in vehicle tunnels. Cameras may be placed throughout the vehicle tunnel 200 to capture images from a variety of perspectives. These may include vehicle tunnel entrance area cameras, vehicle tunnel midsection cameras, and vehicle tunnel exit area cameras. A variety of other sensors may also included in the vehicle tunnel.

Figure 2B:
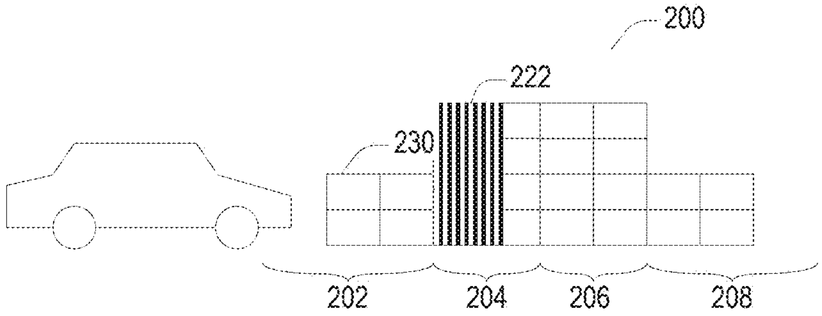

FIG. 2B includes the striped lighting pattern panels in vehicle tunnel midsection 204. In particular embodiments, the striped lighting pattern panels are mounted between uniform lighting pattern panels and the object to be illuminated. In other examples, the striped lighting pattern panels are lighting panels themselves and are used in lieu of uniform lighting pattern panels during construction of the vehicle tunnel. In particular embodiments, high resolution cameras are placed 2 feet apart both in the horizontal and vertical directions throughout sections the different sections of a vehicle tunnel. In this configuration striped lighting pattern panels can be particularly effective for detecting vehicle imperfections. By using striped lighting pattern panels in only a portion of the lighting tunnel, vehicle surface images or images of various components of the vehicle can be illuminated and captured with both uniform lighting and striped lighting in a single pass of the vehicle through the tunnel. According to various embodiments, the striped lighting pattern panels 222 can create alternating light stripes or light and dark geometric patterns on vehicle surfaces in order to allow detection of vehicle imperfections.

Figure 2C:
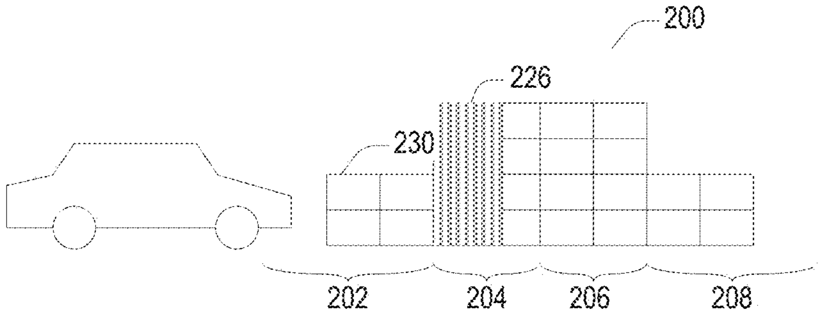

FIG. 2C illustrates an example of the vehicle tunnel 200 having variably striped lighting panels or variably striped lighting pattern panels 226. According to various embodiments, variably switched uniform and striped lighting pattern panels can operate either as uniform lighting pattern panels or striped lighting pattern panels depending on operator input. In particular embodiments, a single lighting panel includes opaque barrier separating strips of led lights. Alternating rows are dark, dark gaps, or dark lines when the led lights are switched off and when the led lights in the alternating rows are switched on, the panel 226 becomes a uniform lighting pattern panel. In some embodiments, the dark gaps themselves are filled with non-reflective material. In some examples, the led lighting may be switched to different colors to provide better contrast against the color of the vehicle. According to various embodiments, complementary colors are selected for the lighting to provide greater contrast. If a vehicle is red, red's complementary color of green may be selected for the lighting panels for higher contrast images. If a vehicle is blue, blue's complementary color of orange may be selected for the lighting panels for higher contrast images. In particular embodiments, the striped lighting panels may be placed in a vehicle tunnel exit area 208 or a vehicle tunnel midsection 204 for particularly effective image capture.

Figure 2D:
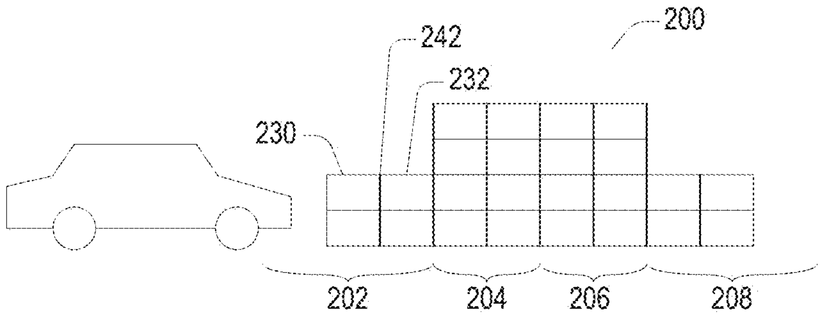

FIG. 2D illustrates an example of a striped lighting pattern created by using existing dark gaps between uniform lighting panels. According to various embodiments, existing panels 230 and 232 have dark gaps 242 between them. The dark gap contrasts with the existing panels 230 and 232 that may emit uniform lighting. According to various embodiments, high speed cameras can be used to capture images that show the contrast between these dark gaps 242 and the uniform lighting pattern panels 230 and 232. In particular embodiments, high-speed cameras are specialized cameras capable of capturing images at extremely high frame rates, making lighting contrast details visible that would otherwise be missed. According to various embodiments, a high-speed camera having a frame rate greater than 240 FPS is used. In some instances, a high-speed camera having greater than 1,000 FPS is particularly effective. The high-speed can also have a shutter speed of $1/125$s or better. In particular embodiments, the gap between the uniform lighting panels 230 and 232 is configured to be greater than 4 mm.

According to various embodiments, the gap size between uniform lighting panels is inversely proportional to the frame rate of the high-speed camera. In particular embodiments, for a frame rate of 1000 FPS, a gap width in the range of 0.74 cm to 1.5 cm can be utilized. In some examples, for a frame rate of 500 FPS, a gap width between 1.5 cm and 2.5 cm may be appropriate. In yet other implementations, a frame rate of 240 FPS could necessitate a gap width ranging from 2.5 cm and 3.5 cm. It should be noted that these values serve as general guidelines and may require adjustments based on specific system parameters.

According to various embodiments, the desired stripe width can influence the optimal gap size. For example, narrower stripes may necessitate narrow gaps, e.g. 0.25 cm to 0.95 cm, to ensure adequate definition and contrast. In particular implementations, the speed of the object being photographed should be considered. For faster-moving objects, wider gaps may be advantageous to maintain a stationary or predictable stripe pattern relative to the object's motion.

Furthermore, according to various embodiments, the intensity of the light source can play a role in determining the appropriate gap size. Brighter light sources may enable the use of slightly narrower gaps while still achieving well-defined stripes. In some examples, the camera sensor size and resolution could also be taken into account. Higher resolution sensors with smaller pixels might benefit from narrower gaps to capture finer details within the striped pattern.

According to various embodiments, a range of stripe widths might be used in conjunction with each other, allowing for the detection of both subtle and significant defects or damage. For example, narrow stripes, e.g. 0.5 cm, may be beneficial for detecting fine scratches, paint chips, and minor dents, medium stripes, e.g. 1 cm, may be effective for revealing moderate-sized dents and surface imperfections, and wide stripes, e.g. 1.5 cm, may be useful for highlighting large dents, creases, or significant bodywork damage.

Figure 3:
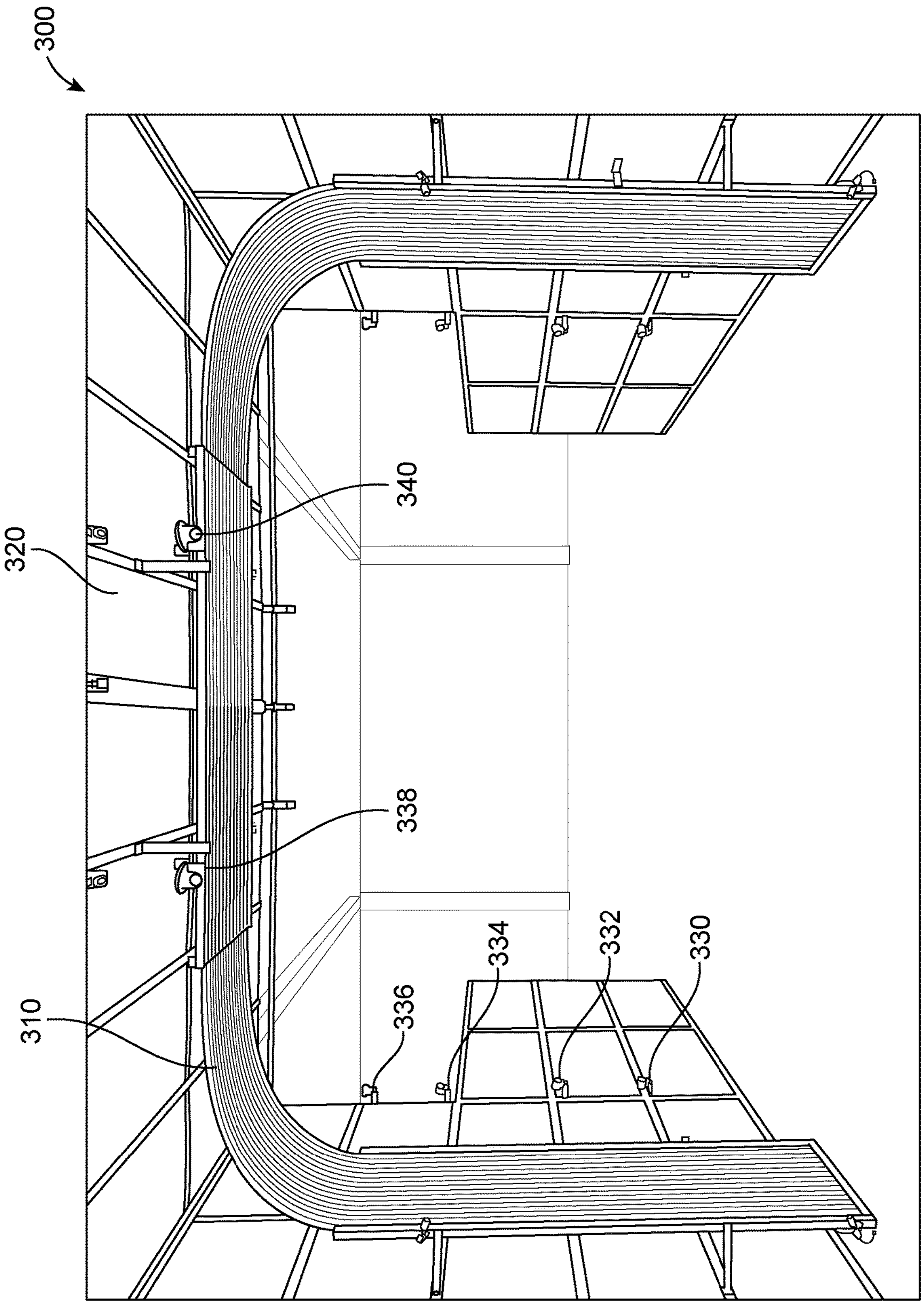
FIG. 3 illustrates an example of a semicylindrical tunnel having multiple striped lighting pattern panels.

FIG. 3 illustrates an example of a vehicle tunnel having striped lighting pattern panels 310, uniform lighting pattern panels 320 and cameras 330, 332, 334, 336, 338, and 340 as well as potentially other cameras, sensors, and detectors. According to various embodiments, the uniform lighting pattern panels 320 emit light themselves and are used to form the structure of a tunnel or may be mounted in the tunnel constructed using other materials. In other examples, uniform lighting pattern panels 320 may be translucent diffusers configured to emit light generated elsewhere. Similarly, the striped lighting pattern panels 310 may themselves generate light or may be filters or diffusers used to create striped lighting patterns using light generated elsewhere. The uniform lighting pattern panels 320 and the striped lighting pattern panels 310 may form a semicylindrical vehicle tunnel 300. According to various embodiments, it is recognized that edges and corners are detrimental to effective uniform lighting and consequently curved surfaces such as striped lighting pattern panels 310 is provided. Any tunnel structure that includes curved surfaces without edges and corners that can accommodate a vehicle passing through it is referred to herein as a semicylindrical vehicle tunnel. In particular embodiments, a vehicle tunnel including some non-curved, flat surfaces while still including curved, cylindrical surfaces is referred to herein as a semicylindrical vehicle tunnel.

According to various embodiments, cameras including cameras 330, 332, 334, 336, 338, and 340 are placed in various locations in the vehicle tunnel to capture images for damage assessment. In particular embodiments, when setting up multiple cameras in a vehicle tunnel, several key factors are considered, including distance, focal length, and camera angles, to ensure effective image capture. According to various embodiments, distance plays a significant role as it affects the field of view and perspective. Cameras placed too close to an object may introduce distortion, while cameras placed too far may miss finer details. A consistent distance is generally preferred as it helps maintain uniformity across perspectives. Focal length is another significant consideration, influencing the field of view and depth of field.

Camera spacing and angles are evaluated to effectively capture numerous vehicle surfaces from multiple perspectives. In particular embodiments, a semicircular arrangement of cameras, with even horizontal and vertical spacing, promotes comprehensive coverage. According to various embodiments, a 30-50% overlap between the field of view of adjacent cameras allows for easier stitching of images if additional processing is to be performed on the images. Vertical variation in camera placement, such as positioning cameras at different heights, adds depth and variety to the captured data. Additionally, synchronization between the cameras may be used to capture motion. According to various embodiments, techniques of the present invention further assess proposed camera configurations while evaluating factors such as camera locations and angles to derive a camera configuration score. The camera configuration score can be used to revise and refine camera placement for detecting damage or vehicle imperfections.

Figure 4:
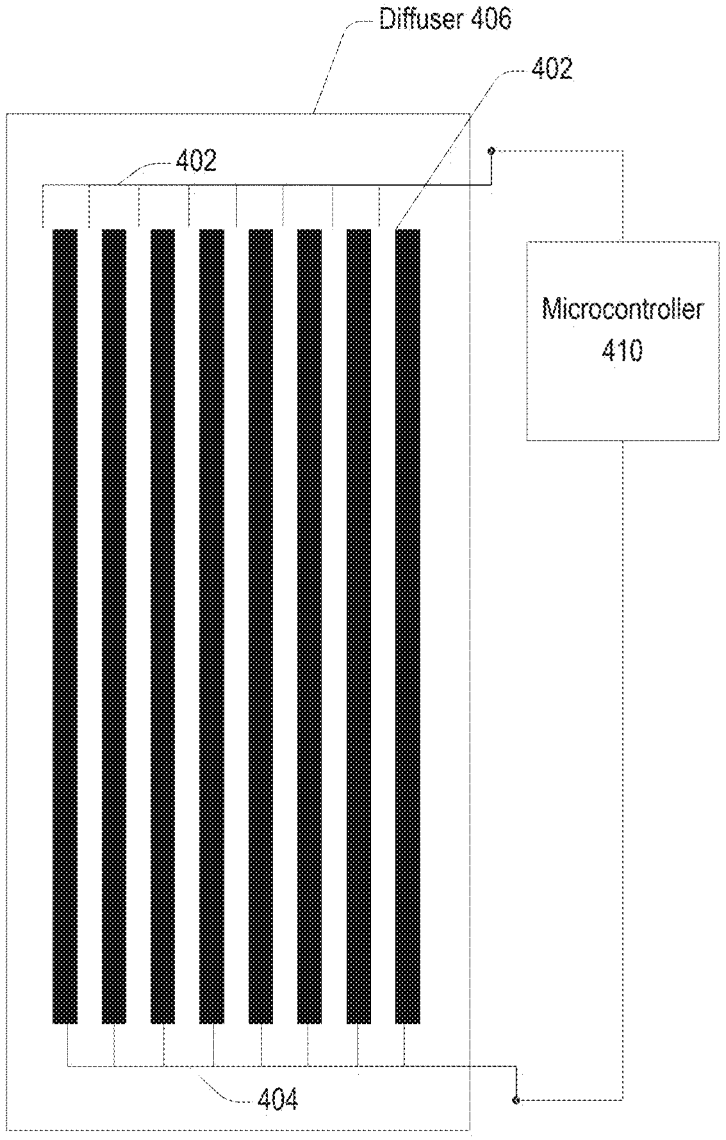
FIG. 4 illustrates an example of an image of a vehicle surface illuminated by striped lighting.

The vehicle tunnel may include one or more striped lighting pattern panels or may also include a variably switched lighting pattern panel. FIG. 4 illustrates one example of a variably switched lighting pattern panel. According to various embodiments white striped lighting 402 alternates with dark striped lighting 404. White striped lighting 402 may be white light emitting diodes (LEDs) while dark striped lighting 404 may be white LEDs switched off to create a striped lighting pattern panel. However, in other circumstances, the dark striped lighting 404 may be variably switched on to create a uniform lighting pattern panel.

According to various embodiments, a lighting barrier may be is placed between each strip of lighting, e.g. white striped lighting 402 and striped lighting 404 to maintain contrast in the striped lighting pattern panel. In particular embodiments, an effective barrier between light and dark strips of LEDs can be achieved using an opaque divider from materials such as aluminum, plastic, or black acrylic. This barrier can be designed to physically block the light emitted from the light LED strip, preventing it from spilling into the dark areas. Additionally, the barrier may extend slightly above the length of the LED strips to prevent light leakage at different angles. Proper spacing and careful placement of the barrier can promote sharp, distinct separation between the illuminated and non-illuminated sections, enhancing the contrast and visual clarity between the light and dark regions.

In particular embodiments, a diffuser 406 is placed over or in front of the LEDs. The diffuser 406 may be a translucent or frosted material to scatter and soften the emitted light, creating a more uniform and evenly distributed illumination while reducing harsh shadows and hotspots that could adversely affect damage detection. The diffuser 406 may be made from materials such as acrylic, polycarbonate, or frosted glass. According to various embodiments, the thickness and texture of the diffuser material can affect how well the light spreads, with more textured or thicker diffusers often providing a smoother light output.

According to various embodiments, a microcontroller 410 can control whether a variably switched lighting panel operates in a uniform lighting pattern mode or a striped lighting pattern mode by sending signals to control the individual LEDs or strips or rows or columns of LEDs within the panel.

In some examples, the microcontroller 410 or controller receives manual or automatic input, such as a button press or a signal from a connected system, indicating the desired lighting mode. Based on this input, the microcontroller 410 then activates or deactivates specific groups of LEDs within the panel.

For uniform lighting pattern mode, the microcontroller would activate all LEDs simultaneously, creating a continuous, even illumination. In striped lighting pattern mode, the microcontroller 410 would selectively activate alternating rows or sections of LEDs, resulting in the striped pattern.

Figure 5:
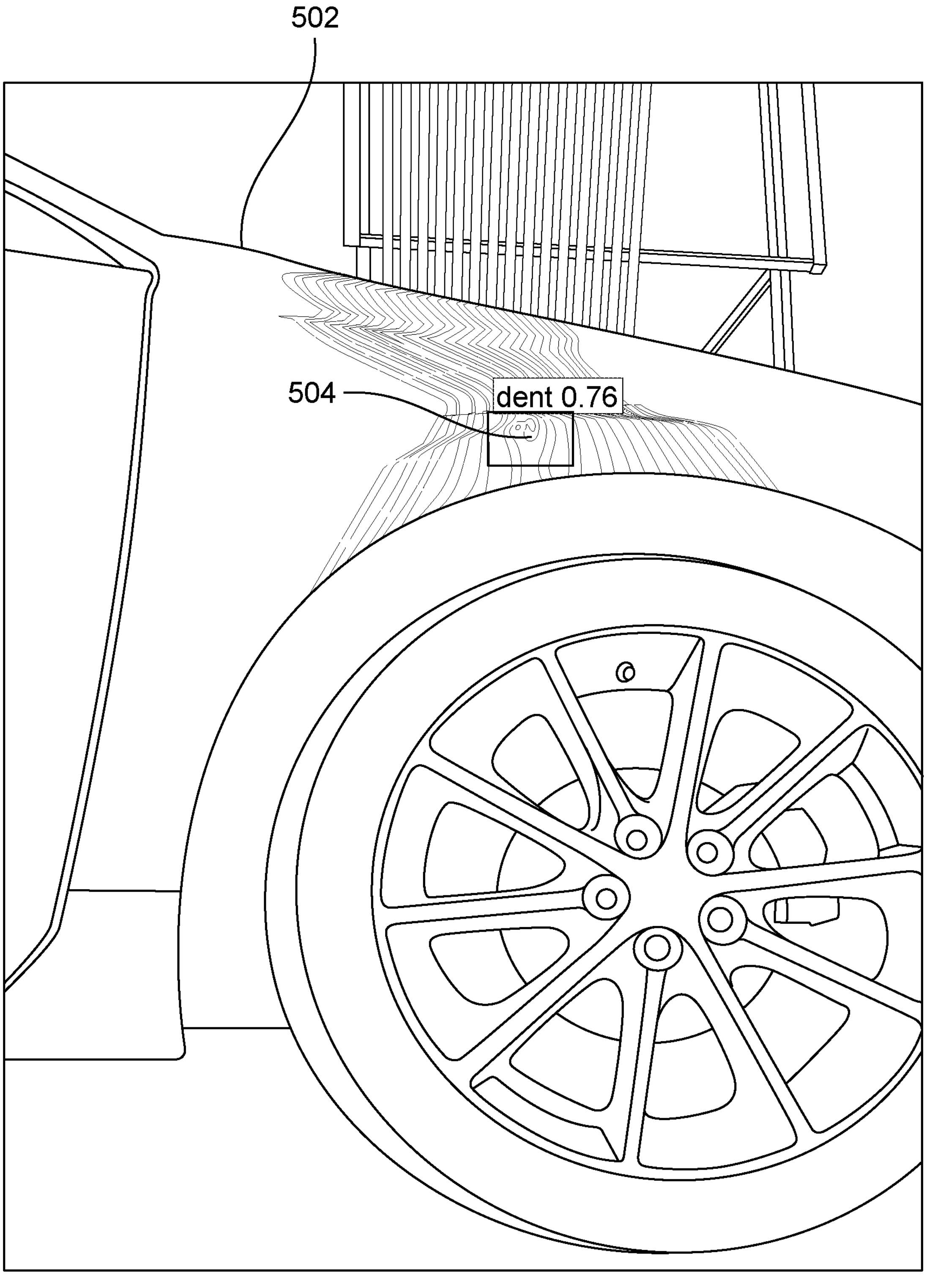
FIG. 5 illustrates an example of a variably switched lighting panel.
Figure 6:
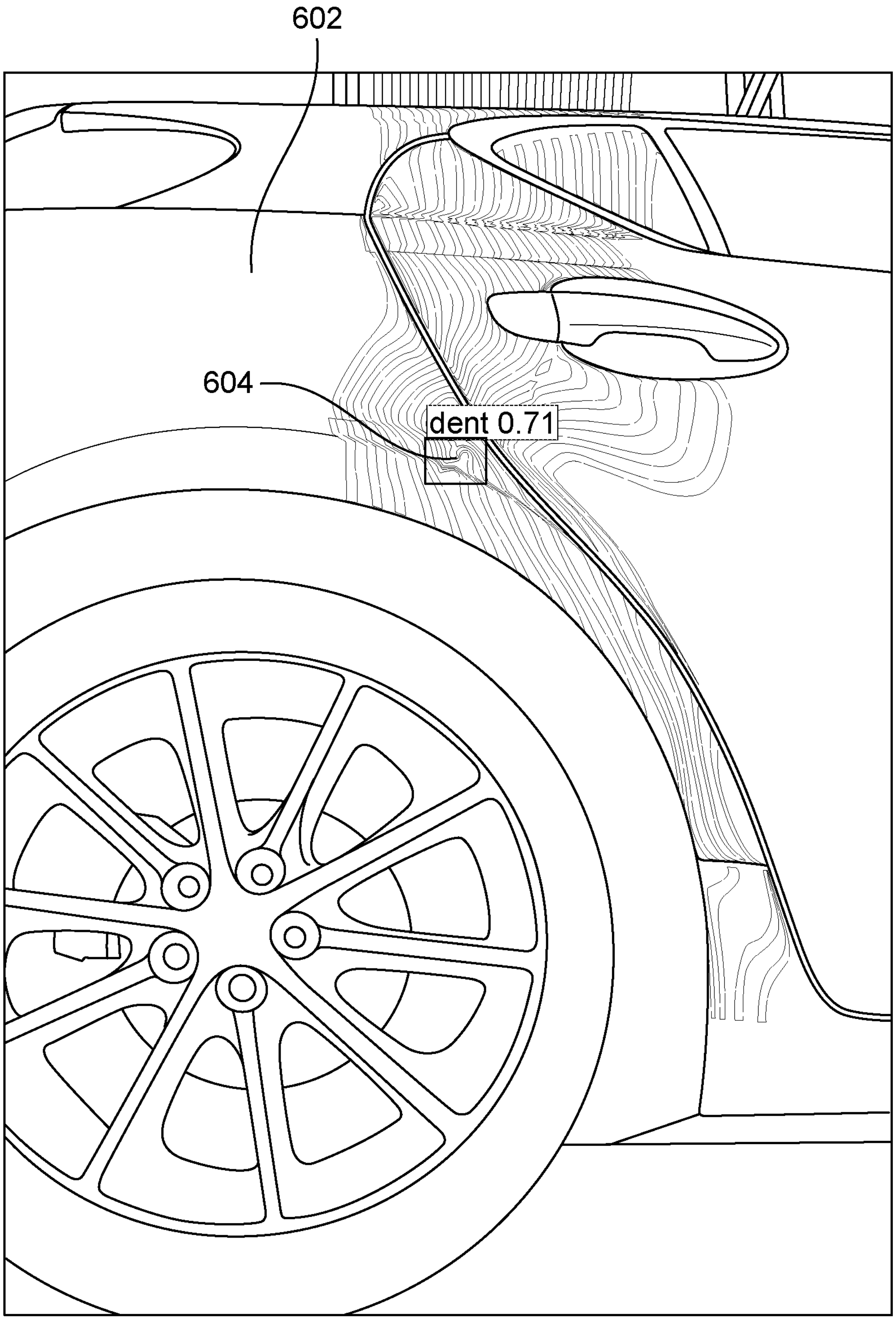
FIG. 6 illustrates another example of an image of a vehicle surface illuminated by striped lighting.

Striped lighting pattern panels can be used to illuminate vehicle surfaces so that vehicle surface images can be captured. FIG. 5 illustrates an example of a vehicle surface image or vehicle component image. These images can be combined with others to form manipulable objects that can be viewed and rotated by users along multiple axes. Vehicle surface image 502 shows striped lighting illuminated that reveals a likely imperfection 504. According to various embodiments, various embodiments indicate the likelihood that the imperfection exists at 504. In particular embodiments, there is a 76% chance that a dent is present at 504. FIG. 6 illustrates another example of a vehicle surface image or vehicle component image. According to various embodiments, vehicle surface image 602 is illuminted by a striped lighting pattern panel and reveals that there is a 71% chance that a dent is present at 604.

Figure 7:
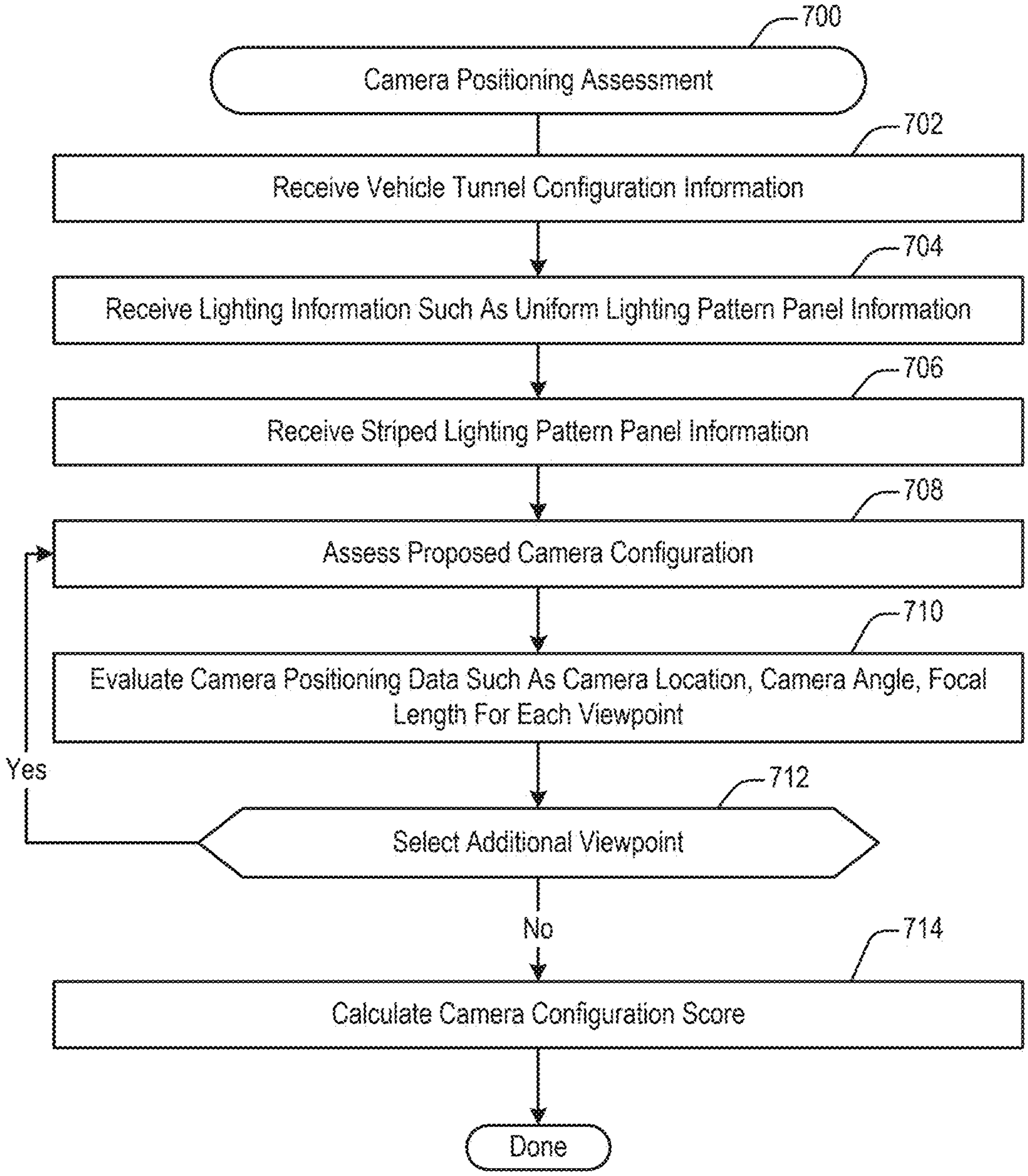
FIG. 7 illustrates an example of a mechanism for assessing camera positioning in vehicle tunnels.

A variety of camera configurations and arrangements can be used to capture these vehicle panel images. FIG. 7 illustrates an example of a mechanism for scoring and rating these camera configurations using camera positioning assessment 700. To assess the placement of cameras in a vehicle tunnel designed to capture images of vehicles for damage detection, several techniques may be used. According to various embodiments, vehicle tunnel configuration information is received at 702. This vehicle tunnel configuration information may give the dimensions and structure of the vehicle tunnel. At 704, uniform lighting pattern panel information is received. This may indicate the location, size, and brightness of the uniform lighting pattern panels. At 706, striped lighting pattern panel information is received. This may also indicate the location, size, structure, etc., of various lighting pattern panels. At 708, the proposed camera configuration is assessed. This involves evaluating how well the cameras are positioned in relation to the tunnel and the vehicle's movement.

According to various embodiments, the cameras are mounted using pan tilt zoom and are movable. In some instances, the camera positioning can dynamically adjust upon determining the type and/or size of a vehicle.

At 710, the focus is on evaluating camera positioning data, including factors such as the camera location, camera angle, and focal length for each viewpoint. Proper camera positioning ensures that numerous areas of the vehicle are within one or more of the cameras'field of view. According to various embodiments, field of view of one camera overlaps by 20%-50% with neighboring cameras. In particular embodiments, the camera angle refers to the tilt or orientation of the camera, which needs to be carefully set to capture optimal images of vehicle surfaces. Finally, focal length determines the camera's zoom or depth of field, ensuring that images are captured at the right distance with adequate resolution for damage detection.

Once the positioning data is reviewed, any adjustments can be made to improve the coverage or quality of the images. In Step 712, additional viewpoints for images may be selected, ensuring comprehensive coverage of the vehicle. For example, different camera perspectives may be added to focus on specific areas prone to damage, such as wheel wells or bumper regions.

At Step 714, a camera configuration score is calculated based on the alignment, image quality, coverage, and effectiveness of the camera setup. This score acts as a feedback mechanism, helping to identify areas where camera placement can be optimized further. If the score is below a certain threshold, adjustments to camera positioning, angle, or focal length can be made to improve the overall configuration, ultimately ensuring more reliable and accurate image capture for damage detection within the tunnel environment.

Figure 8:
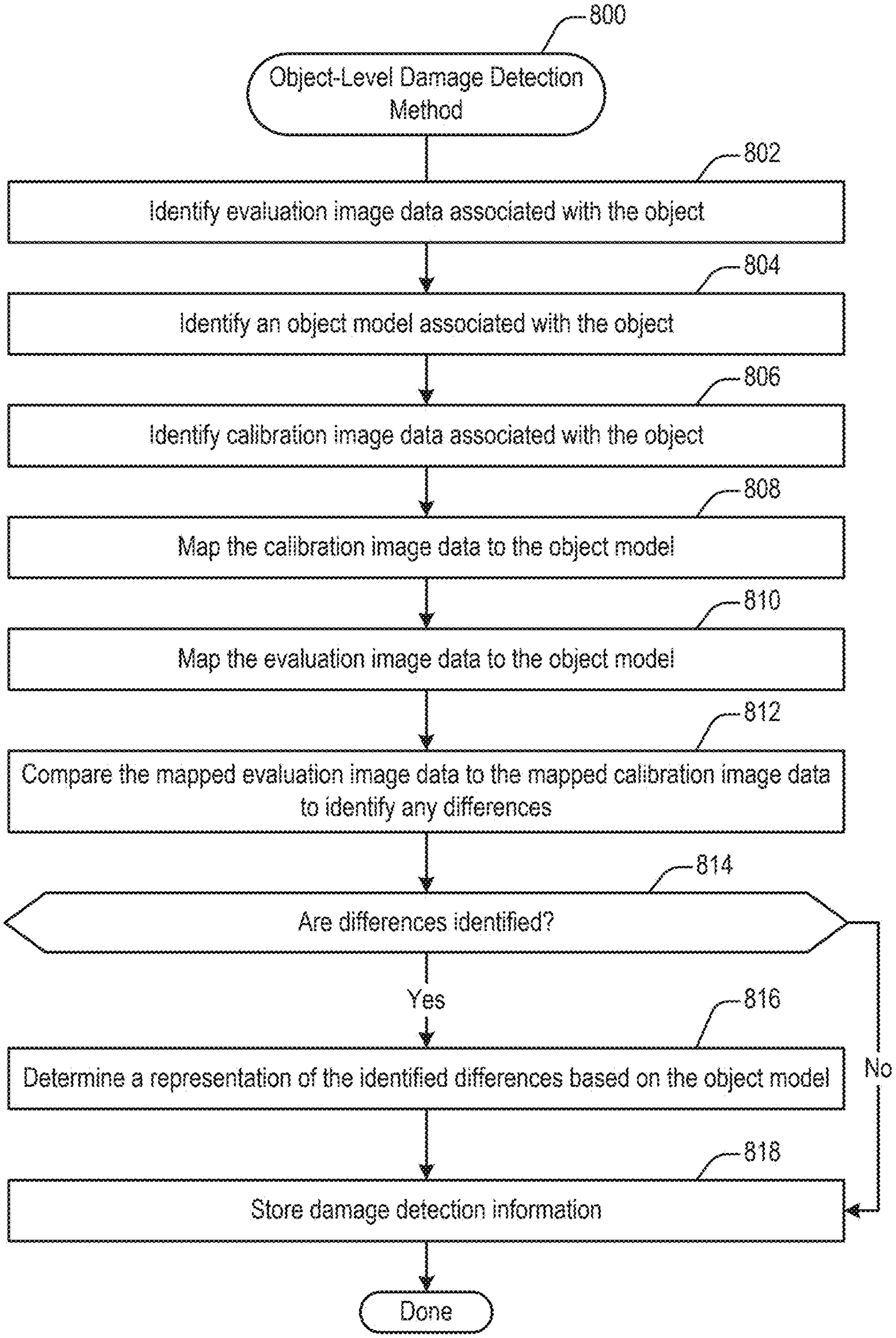
FIG. 8 illustrates one example of a mechanism for damage detection, performed in accordance with various embodiments.
Figure 9:
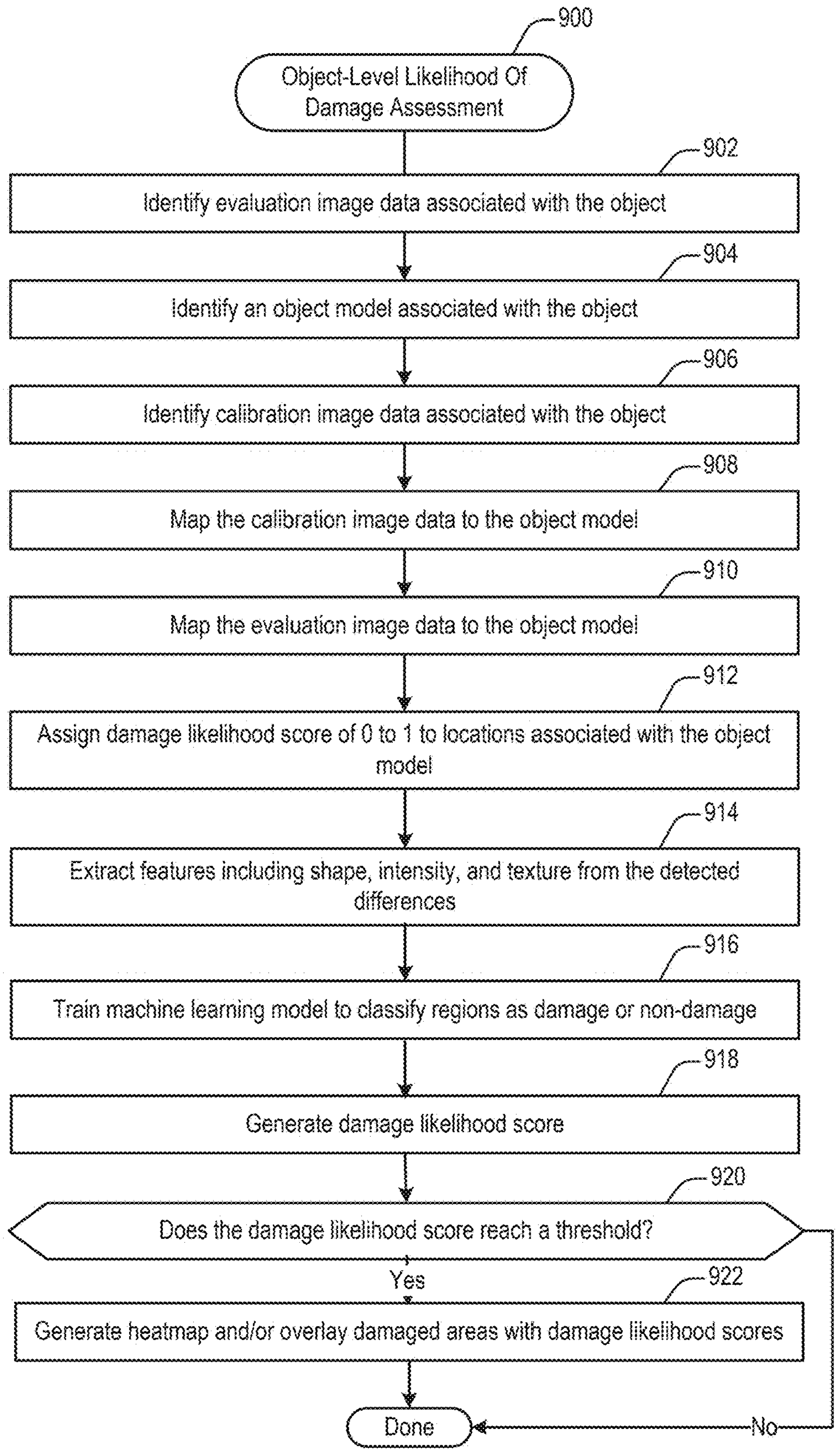
FIG. 9 illustrates one example of a mechanism for assessing the likelihood of damage in a particular location.

In some implementations, the captured images may be stored on a storage device and used to perform damage detection, as discussed with respect to the techniques 800 and 900 in FIGS. 8 and 9. Alternatively, or additionally, the images may be transmitted to a remote location via a network interface.

FIG. 8 illustrates an object-level damage detection technique 800, performed in accordance with one or more embodiments. The technique 800 may be performed at a mobile computing device such as a smart phone. The smart phone may be in communication with a remote server. The technique 800 may be used to detect damage to any of various types of objects.

Evaluation image data associated with the object is identified at 802. According to various embodiments, the evaluation image data may include single images captured from different viewpoints. As discussed herein, the single images may be aggregated into a multi-view capture, which may include data other than images, such as IMU data.

An object model associated with the object is identified at 804. In some implementations, the object model may include a 2D or 3D standardized mesh, model, or abstracted representation of the object. For instance, the evaluation image data may be analyzed to determine the type of object that is represented. Then, a standardized model for that type of object may be retrieved. Alternatively, or additionally, a user may select an object type or object model to use. The object model may include a top-down view of the object.

Calibration image data associated with the object is identified at 806. According to various embodiments, the calibration image data may include one or more reference images. The reference images may include one or more images of the object captured at an earlier point in time. Alternatively, or additionally, the reference images may include one or more images of similar objects. For example, a reference image may include an image of the same type of car as the car in the images being analyzed.

In some implementations, the calibration image data may include a neural network trained to identify damage. For instance, the calibration image data may be trained to analyze damage from the type of visual data included in the evaluation data.

The calibration data is mapped to the object model at 808. In some implementations, mapping the calibration data to the object model may involve mapping a perspective view of an object from the calibration images to a top-down view of the object.

The evaluation image data is mapped to the object model at 810. In some implementations, mapping the evaluation image data to the object model may involve determine a pixel-by-pixel correspondence between the pixels of the image data and the points in the object model. Performing such a mapping may involve determining the camera position and orientation for an image from IMU data associated with the image.

In some embodiments, a dense per-pixel mapping between an image and the top-down view may be estimated at 810. Alternatively, or additionally, location of center of an image may be estimated with respect to the top-down view. For example, a machine learning algorithm such as deep net may be used to map the image pixels to coordinates in the top-down view. As another example, joints of a 3D skeleton of the object may be estimated and used to define the mapping. As yet another example, component-level detectors may be used to identify specific components of the object.

In some embodiments, the location of one or more object parts within the image may be estimated. Those locations may then be used to map data from the images to the top-down view. For example, object parts may be classified on a pixel-wise basis. As another example, the center location of object parts may be determined. As another example, the joints of a 3D skeleton of an object may be estimated and used to define the mapping. As yet another example, component-level detectors may be used for specific object components.

In some implementations, images may be mapped in a batch via a neural network. For example, a neural network may receive as input a set of images of an object captured from different perspectives. The neural network may then detect damage to the object as a whole based on the set of input images.

The mapped evaluation image data is compared to the mapped calibration image data at 812 to identify any differences. According to various embodiments, the data may be compared by running a neural network on a multi-view representation as a whole. Alternatively, or additional, the evaluation and image data may be compared on an image-by-image basis. If it is determined at 814 that differences are identified, then at 816 a representation of the identified differences is determined. According to various embodiments, the representation of the identified differences may involve a heatmap of the object as a whole. Alternatively, one or more components that are damaged may be isolated and presented individually.

At 818, a representation of the detected damage is stored on a storage medium or transmitted via a network. In some implementations, the representation may include an estimated dollar value. Alternatively, or additionally, the representation may include a visual depiction of the damage. Alternatively, or additionally, affected parts may be presented as a list and/or highlighted in a 3D CAD model.

In particular embodiments, damage detection of an overall object representation may be combined with damage representation on one or more components of the object. For example, damage detection may be performed on a closeup of a component if an initial damage estimation indicates that damage to the component is likely.

FIG. 9 illustrates a technique for assessing the likelihood of damage. According to various embodiments, a damage detection evaluation system not only detects damage but also differentiates between genuine damage and artifacts or variations that might be mistaken for damage. In particular embodiments, a layer of probabilistic analysis is introduced on top of the existing damage detection mechanisms.

According to various embodiments, evaluation image data associated with the object is identified at 902. According to various embodiments, the evaluation image data may include single images captured from different viewpoints. As discussed herein, the single images may be aggregated into a multi-view capture, which may include data other than images, such as IMU data.

An object model associated with the object is identified at 904. In some implementations, the object model may include a 2D or 3D standardized mesh, model, or abstracted representation of the object. For instance, the evaluation image data may be analyzed to determine the type of object that is represented. Then, a standardized model for that type of object may be retrieved. Alternatively, or additionally, a user may select an object type or object model to use. The object model may include a top-down view of the object.

Calibration image data associated with the object is identified at 906. According to various embodiments, the calibration image data may include one or more reference images. The reference images may include one or more images of the object captured at an earlier point in time. Alternatively, or additionally, the reference images may include one or more images of similar objects. For example, a reference image may include an image of the same type of car as the car in the images being analyzed.

In some implementations, the calibration image data may include a neural network trained to identify damage. For instance, the calibration image data may be trained to analyze damage from the type of visual data included in the evaluation data.

The calibration data is mapped to the object model at 908. In some implementations, mapping the calibration data to the object model may involve mapping a perspective view of an object from the calibration images to a top-down view of the object. According to various embodiments, the evaluation image data is mapped to the object model at 910. In some implementations, mapping the evaluation image data to the object model may involve determining a pixel-by-pixel correspondence between the pixels of the image data and the points in the object model. Performing such a mapping may involve determining the camera position and orientation for an image from IMU data associated with the image.

According to various embodiments, instead of detecting damage, the damage detection system also generates a likelihood map. In particular embodiments, this map assigns a probability score (0 to 1) to each point on the object model at 912, reflecting the likelihood of actual damage at that location. In some implementations, features are extracted from the detected differences at 914. The features may include shape or whether the difference is localized or widespread. Sharp and irregular edges may indicate real damage. The features may also include intensity or how pronounced the difference is between pixel values as well as texture or whether the damaged area has a different texture than surrounding regions. According to various embodiments, shape may refer to the outline or geometric form of the object in the image. Intensity may relate to the brightness or darkness of pixels within the image, reflecting the object's color and how light interacts with it, and texture may describe the surface characteristics of the object as seen in the image, e.g. whether it's smooth, rough, patterned, etc.

In particular embodiments, a machine learning model may also be trained to classify regions as damaged or non-damaged 916. According to various embodiments, the machine learning model output along with extracted features and confidence map may be evaluated to generate a damage likelihood score at 918. At 920 if the damage likelihood score reaches a threshold, a heat map may be generated for that particular area at 922. Regions exceeding this threshold are considered likely damaged. In particular embodiments, morphological operations such as erosion and dilation area applied to refine the damage regions and remove noise.

Damaged areas may include an overlay showing damage likelihood scores. The overlay may be a separate layer having positions corresponding to that of an MVIDMR. If the damage likelihood score does not reach the threshold, e.g 0.6 or 0.7, a heatmap may not be generated.

By integrating probabilistic analysis and machine learning, the reliability of damage detection can be significantly enhanced while providing clearer information on the likelihood of damage at specific locations on a vehicle or object.

Figure 10:
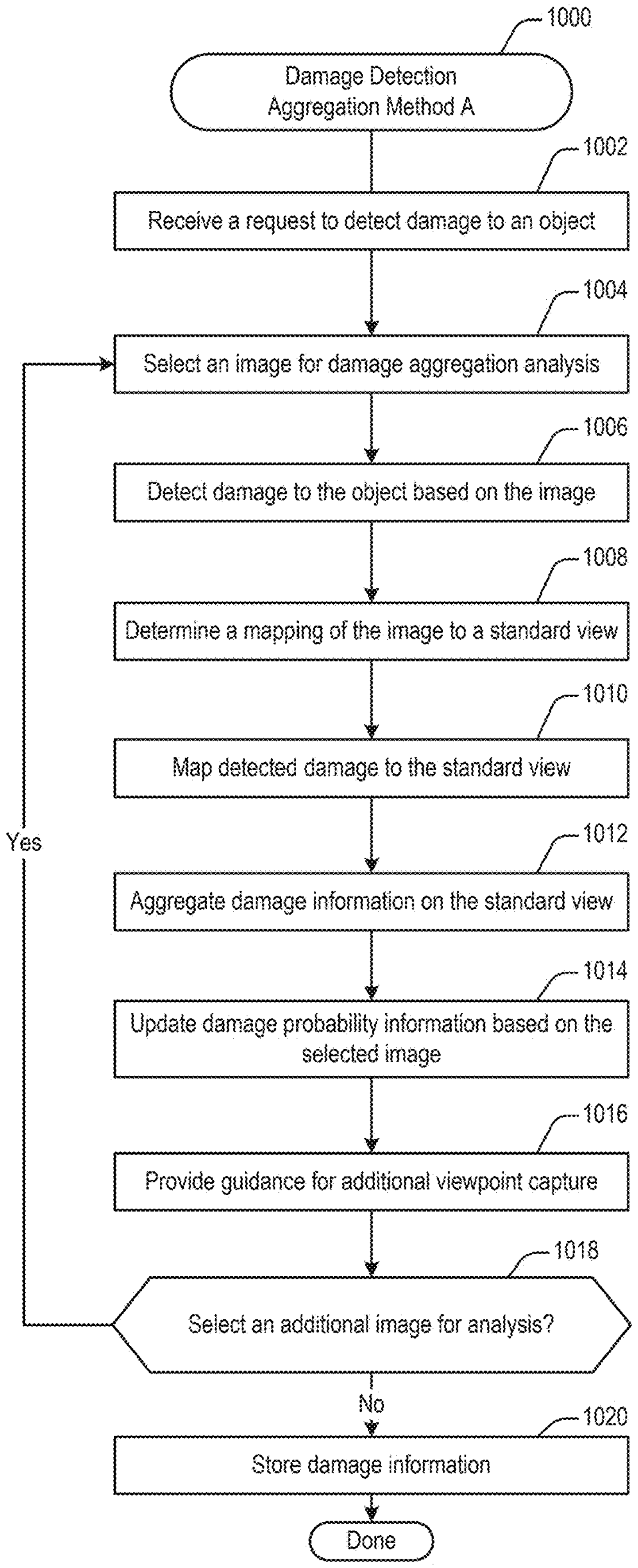
FIG. 10 illustrates one example of a damage detection aggregation method, performed in accordance with one or more embodiments.

FIG. 10 illustrates a technique 1000 for aggregating detected damage to an object, performed in accordance with one or more embodiments. According to various embodiments, the technique 1000 may be performed at a mobile computing device such as a smart phone. The smart phone may be in communication with a remote server. Alternately, or additionally, some or all of the technique 1000 may be performed at a remote computing device such as a server. The technique 1000 may be used to detect damage to any of various types of objects. However, for the purpose of illustration, many examples discussed herein will be described with reference to vehicles.

A request to detect damage to an object is received at 1002. In some implementations, the request to detect damage may be received at a mobile computing device such as a smart phone. In particular embodiments, the object may be a vehicle such as a car, truck, or sports utility vehicle.

In some implementations, the request to detect damage may include or reference input data. The input data may include one or more images of the object captured from different perspectives. Alternatively, or additionally, the input data may include video data of the object. In addition to visual data, the input data may also include other types of data, such as IMU data.

An image is selected for damage aggregation analysis at 1004. According to various embodiments, the image may be captured at a mobile computing device such as a mobile phone. In some instances, the image may be a view in a multi-view capture. A multi-view capture may include different images of the object captured from different perspectives. For instance, different images of the same object may be captured from different angles and heights relative to the object.

In some implementations, images may be selected in any suitable order. For example, images may be analyzed sequentially, in parallel, or in some other order. As another example, images may be analyzed live as they are captured by a mobile computing device, or in order of their capture.

In particular embodiments, selecting an image for analysis may involve capturing an image. According to various embodiments, capturing the image of the object may involve receiving data from one or more of various sensors. Such sensors may include, but are not limited to, one or more cameras, depth sensors, accelerometers, and/or gyroscopes. The sensor data may include, but is not limited to, visual data, motion data, and/or orientation data. In some configurations, more than one image of the object may be captured. Alternatively, or additionally, video footage may be captured.

At 1006, damage to the object is detected. According to various embodiments, damage may be detected by applying a neural network to the selected image. The neural network may identify damage to the object included in the image. In particular embodiments, the damage may be represented as a heatmap. The damage information may identify the damage type and/or severity. For example, the damage information may identify damage as being light, moderate, or severe. As another example, the damage information may identify the damage as a dent or a scratch.

A mapping of the selected perspective view image to a standard view is determined at 1008, and detected damage is mapped to the standard view at 1010. In some embodiments, the standard view may be determined at 1012 based on user input. For example, the user may identify a vehicle in general or a car, truck, or sports utility vehicle in particular as the object type.

In particular embodiments, a standard view may be determined by performing object recognition on the object represented in the perspective view image. The object type may then be used to select a standard image for that particular object type. Alternately, a standard view specific to the object represented in the perspective view may be retrieved. For example, a top-down view, 2D skeleton, or 3D model may be constructed for the object at an earlier point in time before damage has occurred.

In some embodiments, damage mapping may be performed by using the mapping of the selected perspective view image to the standard view to map the damage detected at 1006 to the standard view. For example, heatmap colors may be mapped from the perspective view to their corresponding locations on the standard view. As another example, damage severity and/or type information may be mapped from the perspective view to the standard view in a similar fashion.

In some implementations, a standard view may be a top-down view of the object that shows the top and the sides of the object. A mapping procedure may then map each point in the image to a corresponding point in the top-down view. Alternately, or additionally, a mapping procedure may map each point in the top-down view to a corresponding point in the perspective view image.

In some embodiments, a neural network may estimate 2D skeleton joints for the image. Then, a predefined mapping may be used to map from the perspective view image to the standard image (e.g., the top-down view). For instance, the predefined mapping may be defined based on triangles determined by the 2D joints.

In some implementations, a neural network may predict a mapping between a 3D model (such as a CAD model) and the selected perspective view image. The damage may then be mapped to, and aggregated on, the texture map of the 3D model. In particular embodiments, the constructed and mapped 3D model may then be compared with a ground truth 3D model.

According to various embodiments, the ground truth 3D model may be a standard 3D model for objects of the type represented, or may be constructed based on an initial set of perspective view images captured before damage is detected. Comparisons of the reconstructed 3D model to the expected 3D model may be used as an additional input source or weight during aggregate damage estimation. Such techniques may be used in conjunction with live, prerecorded, or guided image selection and analysis.

According to various embodiments, skeleton detection may involve one or more of a variety of techniques. Such techniques may include, but are not limited to: 2D skeleton detection using machine learning, 3D pose estimation, and 3D reconstruction of a skeleton from one or more 2D skeletons and/or poses.

Damage information is aggregated on the standard view at 1016. According to various embodiments, aggregating damage on the standard view may involve combining the damage mapped at operation 1010 with damage mapped for other perspective view images. For example, damage values for the same component from different perspective view images may be summed, averaged, or otherwise combined.

In some implementations, aggregating damage on the standard view may involve creating a heatmap or other visual representation on the standard view. For example, damage to a portion of the object may be represented by changing the color of that portion of the object in the standard view.

According to various embodiments, aggregating damage on the standard view may involve mapping damage back to one or more perspective view images. For instance, damage to a portion of the object may be determined by aggregating damage detection information from several perspective view images. That aggregated information may then be mapped back to the perspective view images. Once mapped back, the aggregated information may be included as a layer or overlay in an independent image and/or a multi-view capture of the object.

Damage probability information is updated based on the selected image at 1014. According to various embodiments, the damage probability information may identify a degree of certainty with which detected damage is ascertained. For instance, in a given perspective view it may be difficult to determine with certainty whether a particular image of an object portion depicts damage to the object or glare from a reflected light source. Accordingly, detected damage may be assigned a probability or other indication of certainty. However, the probability may be resolved to a value closer to zero or one with analysis of different perspective views of the same object portion.

In particular embodiments, the probability information for aggregated damage information in standard view may be updated based on from which views the damage was detected. For example, damage likelihood may increase if it is detected from multiple viewpoints. As another example, damage likelihood may increase if it is detected from one or more close-up views. As another example, damage likelihood may decrease if damage is only detected in one viewpoint but not in others. As yet another example, different results may be used to "vote" on a common representation.

If the determination is made to capture an additional image, then at 1016 guidance for additional viewpoint capture is provided. In some implementations, the image collection guidance may include any suitable instructions for capturing an additional image that may assist in resolving uncertainty. Such guidance may include an indication to capture an additional image from a targeted viewpoint, to capture an additional image of a designated portion of the object, or to capture an additional image at a different level of clarity or detail. For example, if possible damage is detected, then feedback may be provided to capture additional detail at the damaged location.

In some implementations, the guidance for additional viewpoint capture may be provided so as to resolve damage probability information as discussed with respect to the operation 1014. For example, if the damage probability information is very high (e.g., 90+%) or very low (e.g., 10−%) for a given object component, additional viewpoint capture may be unnecessary. However, if damage probability information is relatively indeterminate (e.g., 50%), then capturing an additional image may help to resolve the damage probability.

In particular embodiments, the thresholds for determining whether to provide guidance for an additional image may be strategically determined based on any of a variety of considerations. For example, the threshold may be determined based on the number of images of the object or object component that have been previously captured. As another example, the threshold may be specified by a systems administrator.

According to various embodiments, the image collection feedback may include any suitable instructions or information for assisting a user in collecting additional images. Such guidance may include, but is not limited to, instructions to collect an image at a targeted camera position, orientation, or zoom level. Alternatively, or additionally, a user may be presented with instructions to capture a designated number of images or an image of a designated portion of the object.

For example, a user may be presented with a graphical guide to assist the user in capturing an additional image from a target perspective. As another example, a user may be presented with written or verbal instructions to guide the user in capturing an additional image.

At 1018, a determination is made as to whether to select an additional image for analysis. In some implementations, the determination may be made at least in part based on an analysis of the one or more images that have already been captured. If the damage analysis is inconclusive, then an additional image may be captured for analysis. Alternately, each available image may be analyzed. Damage information may be stored at 1020.

In some embodiments, the system may analyze the captured image or images to determine whether a sufficient portion of the object has been captured in sufficient detail to support damage analysis. For example, the system may analyze the capture image or images to determine whether the object is depicted from numerous sides. As another example, the system may analyze the capture image or images to determine whether each panel or portion of the object is shown in a sufficient amount of detail. As yet another example, the system may analyze the capture image or images to determine whether each panel or portion of the object is shown from a sufficient number of viewpoints.

When it is determined to not select an additional image for analysis, then at 1060 the damage information is stored. For example, the damage information may be stored on a storage device. Alternatively, or additionally, the images may be transmitted to a remote location via a network interface.

In particular embodiments, the operations shown in FIG. 10 may be performed in an order different than that shown. For example, damage to the object may be detected at 1006 after mapping an image to a standard view at 1010. In this way, the damage detection procedure may be tailored to the particular portion of the object reflected in the image.

In some implementations, the technique shown in FIG. 10 may include one or more operations other than those shown in FIG. 10. For example, the damage detection operation discussed with respect to 1006 may include one or more procedures for identifying the object or object component included in the selected image. Such a procedure may include, for instance, a neural network trained to identify object components.

Figure 11:
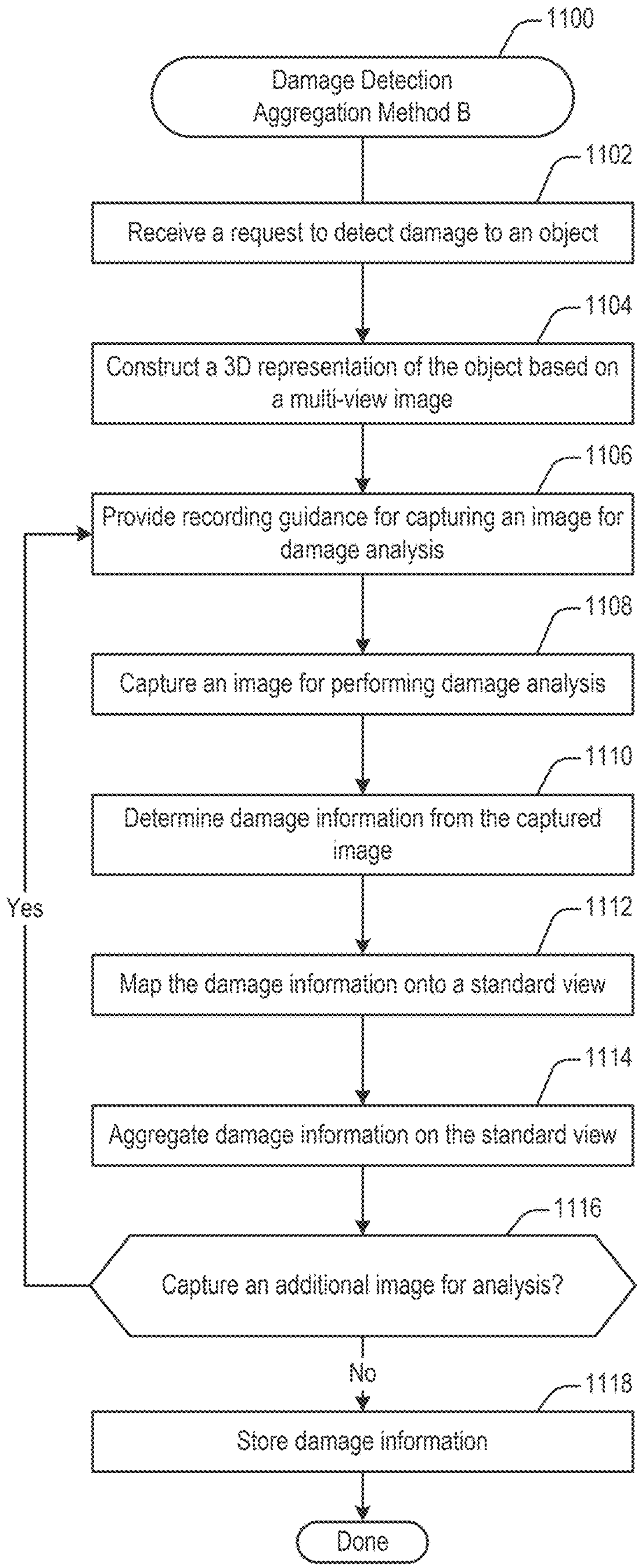
FIG. 11 illustrates a particular example of a damage detection aggregation method, performed in accordance with one or more embodiments.

FIG. 11 illustrates a technique 1100 for aggregating detected damage to an object, performed in accordance with one or more embodiments. According to various embodiments, the technique 1100 may be performed at a mobile computing device such as a smart phone. The smart phone may be in communication with a remote server. The technique 1100 may be used to detect damage to any of various types of objects. However, for the purpose of illustration, many examples discussed herein will be described with reference to vehicles.

FIG. 11 may be used to perform live aggregation of damage detection. By doing a live aggregation of damage detection, the system may obtain a better estimate on which parts of a car are damaged and which aren't. Additionally, based on this the system can guide the user directly to capture more data in order to improve the estimate. According to various embodiments, one or more of the operations discussed with respect to FIG. 11 may be substantially similar to corresponding operations discussed with respect to FIG. 10.

A request to detect damage to an object is received at 1102. In some implementations, the request to detect damage may be received at a mobile computing device such as a smart phone. In particular embodiments, the object may be a vehicle such as a car, truck, or sports utility vehicle.

In some implementations, the request to detect damage may include or reference input data. The input data may include one or more images of the object captured from different perspectives. Alternatively, or additionally, the input data may include video data of the object. In addition to visual data, the input data may also include other types of data, such as IMU data.

A 3D representation of the object based on a multi-view image is determined at 1104. According to various embodiments, the multi-view representation may be predetermined and retrieved at 1104. Alternately, the multi-view representation may be created at 1104. For instance, the multi-view representation may be created based on input data collected at a mobile computing device.

In some implementations, the multi-view representation may be a 360-degree view of the object. Alternately, the multi-view representation may be a partial representation of the object. According to various embodiments, the multi-view representation may be used to construct a 3D representation of the object. For example, 3D skeleton detection may be performed on the multi-view representation including a plurality of images.

At 1106, recording guidance for capturing an image for damage analysis is provided. In some implementations, the recording guidance may guide a user to position a camera to one or more specific positions. Images may then be captured from these positions. The recording guidance may be provided in any of a variety of ways. For example, the user may be guided to position the camera to align with one or more perspective view images in a pre-recorded multi-view capture of a similar object. As another example, the user may be guided to position the camera to align with one or more perspective views of a three-dimensional model.

An image for performing damage analysis is captured at 1108. According to various embodiments, the recording guidance may be provided as part of a live session for damage detection and aggregation. The recording guidance may be used to align the live camera view at the mobile computing device with the 3D representation.

In some implementations, recording guidance may be used to guide a user to capture a specific part of an object in a specific way. For example, recording guidance may be used to guide a user to capture a closeup of the left front door of a vehicle.

Damage information from the captured image is determined at 1110. According to various embodiments, damage may be detected by applying a neural network to the selected image. The neural network may identify damage to the object included in the image. In particular embodiments, the damage may be represented as a heatmap. The damage information may identify the damage type and/or severity. For example, the damage information may identify damage as being light, moderate, or severe. As another example, the damage information may identify the damage as a dent or a scratch.

The damage information is mapped onto a standard view at 1112. According to various embodiments, mobile device and/or camera alignment information may be used to map damage detection data onto a 3D representation. Alternately, or additionally, a 3D representation may be used to map detected damage onto the top-down view. For example, a pre-recorded multi-view capture, predetermined 3D model, or dynamically determined 3D model may be used to create a mapping from one or more perspective view images to the standard view.

The damage information is aggregated on the standard view at 1114. In some implementations, aggregating damage on the standard view may involve creating a heatmap or other visual representation on the standard view. For example, damage to a portion of the object may be represented by changing the color of that portion of the object in the standard view.

According to various embodiments, aggregating damage on the standard view may involve mapping damage back to one or more perspective view images. For instance, damage to a portion of the object may be determined by aggregating damage detection information from several perspective view images. That aggregated information may then be mapped back to the perspective view images. Once mapped back, the aggregated information may be included as a layer or overlay in an independent image and/or a multi-view capture of the object.

At 1116, a determination is made as to whether to capture an additional image for analysis. According to various embodiments, additional images may be captured for analysis until enough data is captured that the degree of certainty about detected damage falls above or below a designated threshold. Alternately, additional images may be captured for analysis until the device stops recording.

When it is determined to not select an additional image for analysis, then at 1118 the damage information is stored. For example, the damage information may be stored on a storage device. Alternatively, or additionally, the images may be transmitted to a remote location via a network interface.

In particular embodiments, the operations shown in FIG. 11 may be performed in an order different than that shown. For example, damage to the object may be detected at 1110 after mapping an image to a standard view at 1112. In this way, the damage detection procedure may be tailored to the particular portion of the object reflected in the image.

In some implementations, the technique shown in FIG. 11 may include one or more operations other than those shown in FIG. 11. For example, the damage detection operation discussed with respect to 1110 may include one or more procedures for identifying the object or object component included in the selected image. Such a procedure may include, for instance, a neural network trained to identify object components.

Figure 12:
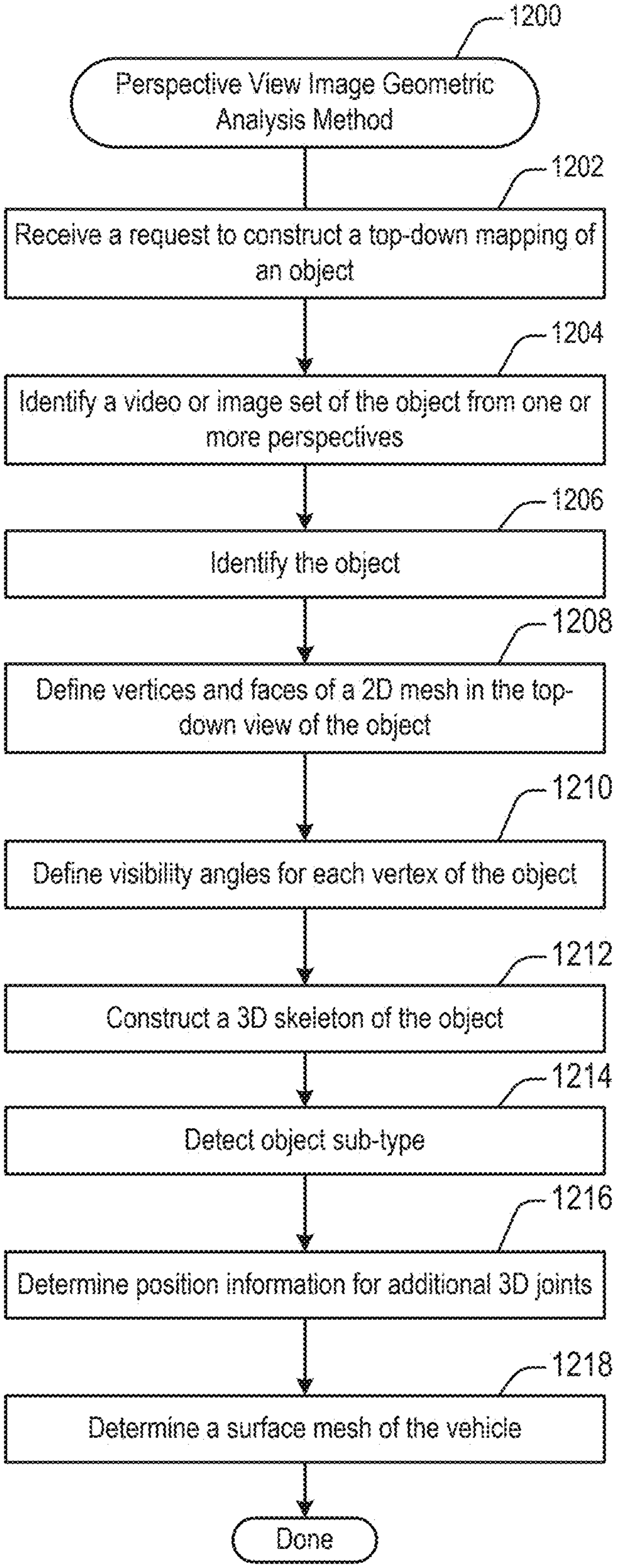
FIG. 12 illustrates one example of a method for performing geometric analysis of a perspective view image, performed in accordance with one or more embodiments.

FIG. 12 illustrates one example of a technique 1200 for performing geometric analysis of a perspective view image, performed in accordance with one or more embodiments. The technique 1200 may be performed on any suitable computing device. For example, the technique 1200 may be performed on a mobile computing device such as a smart phone. Alternately, or additionally, the technique 1200 may be performed on a remote server in communication with a mobile computing device.

A request to construct a top-down mapping of an object is received at 1202. According to various embodiments, the request may be received at a user interface. At 1204, a video or image set of the object captured from one or more perspectives is identified. The video or image set is referred to herein as "source data". According to various embodiments, the source data may include a 360-degree view of the object. Alternately, the source data may include a view that has less than 360-degree coverage.

In some embodiments, the source data may include data captured from a camera. For example, the camera may be located on a mobile computing device such a mobile phone. As another example, one or more traditional cameras may be used to capture such information.

In some implementations, the source data may include data collected from an inertial measurement unit (IMU). IMU data may include information such as camera location, camera angle, device velocity, device acceleration, or any of a wide variety of data collected from accelerometers or other such sensors.

The object is identified at 1206. In some implementations, the object may be identified based on user input. For example, a user may identify the object as a vehicle or person via a user interface component such as a drop-down menu.

In some embodiments, the object may be identified based on image recognition. For example, the source data may be analyzed to determine that the subject of the source data is a vehicle, a person, or another such object. The source data may include a variety of image data. However, in case of a multi-view capture the source data focuses in a particular object from different viewpoints, the image recognition procedure may identify commonalities between the different perspective views to isolate the object that is the subject of the source data from other objects that are present in some portion of the source data but not in other portions of the source data.

At 1208, vertices and faces of a 2D mesh are defined in the top-down view of the object. According to various embodiments, each face may represent a part of the object surface that could be approximated as being planar. For example, when a vehicle is captured in the source data, the vehicle's door panel or roof may be represented as a face in a 2D mesh because the door and roof are approximately planar despite being slightly curved.

In some embodiments, vertices and faces of a 2D mesh may be identified by analyzing the source data. Alternately, or additionally, the identification of the object may allow for the retrieval of a predetermined 2D mesh. For example, a vehicle object may be associated with a default 2D mesh that may be retrieved upon request.

Visibility angles are determined for each vertex of the object at 1210. According to various embodiments, a visibility angle indicates the range of object angles with respect to the camera for which the vertex is visible. In some embodiments, visibility angles of a 2D mesh may be identified by analyzing the source data. Alternately, or additionally, the identification of the object at 1206 may allow for the retrieval of predetermined visibility angle along with a predetermined 2D mesh. For example, a vehicle object may be associated with a default 2D mesh with associated visibility angle that may be retrieved upon request.

A 3D skeleton of the object is constructed at 1212. According to various embodiments, constructing a 3D skeleton may involve any of a variety of operations. For example, 2D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from 2D skeletons and or poses. At 1214, an object subtype may be detected. At 1216, position information for additional 3D joins may be determined. In some embodiments, a surface mesh of the vehicle is determined at 1218

Figure 13:
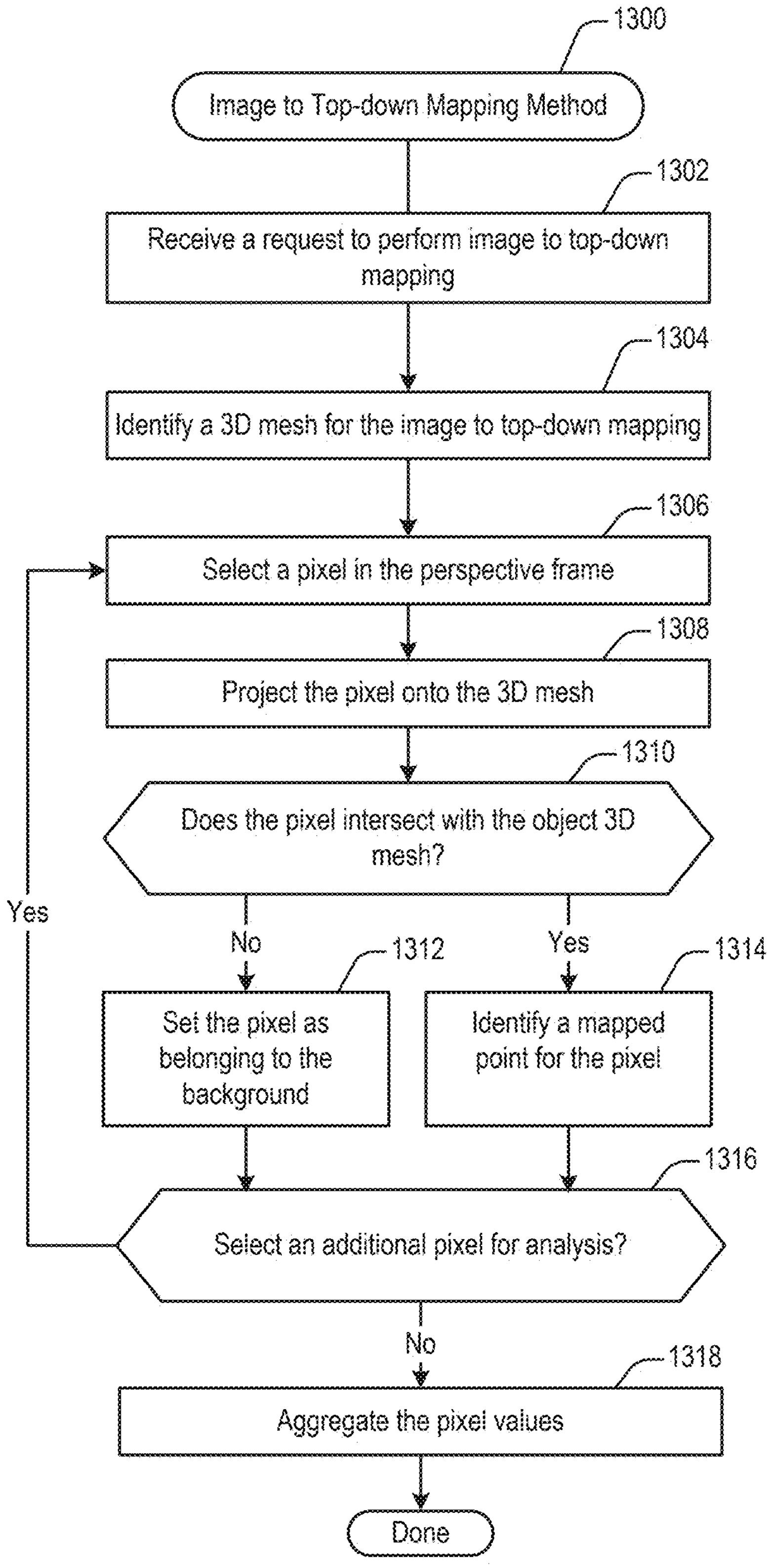
FIG. 13 illustrates one example of a method for performing perspective image to top-down view mapping, performed in accordance with one or more embodiments.

FIG. 13 illustrates one example of a technique 1300 for performing perspective image to top-down view mapping, performed in accordance with one or more embodiments. In some embodiments, the technique 1300 may be performed to map each pixel of an object represented in a perspective view to the corresponding point in a predefined top-down view of that class of objects.

The technique 1300 may be performed on any suitable computing device. For example, the technique 1300 may be performed on a mobile computing device such as a smart phone. Alternately, or additionally, the technique 1300 may be performed on a remote server in communication with a mobile computing device.

A request to construct a top-down mapping of an object is received at 1302. According to various embodiments, the request may be generated after the performance of geometric analysis as discussed with respect to the technique 1200 shown in FIG. 12. The request may identify one or more images for which to perform the top-down mapping.

A 3D mesh for the image to top-down mapping is identified at 1304. The 3D mesh may provide a three-dimensional representation of the object and serve as an intervening representation between the actual perspective view image and the top-down view.

At 1306, a pixel in the perspective frame is selected for analysis. According to various embodiments, pixels may be selected in any suitable order. For example, pixels may be selected sequentially. As another example, pixels may be selected based on characteristics such as location or color. Such a selection process may facilitate faster analysis by focusing the analysis on portions of the image most likely to be present in the 3D mesh.

The pixel is projected onto the 3D mesh at 1308. In some implementations, projecting the pixel onto the 3D mesh may involve simulating a camera ray passing by the pixel position in the image plan and into the 3D mesh. Upon simulating such a camera ray, barycentric coordinates of the intersection point with respect to the vertices of the intersection face may be extracted.

A determination is made at 1310 as to whether the pixel intersects with the object 3D mesh. If the pixel does not intersect with the object 3D mesh, then at 1312 the pixel is set as belonging to the background. If instead the pixel does intersect with the object 3D mesh, then at 1314 a mapped point is identified for the pixel. According to various embodiments, a mapped point may be identified by applying the barycentric coordinates as weights for the vertices of the corresponding intersection face in the top-down image.

In some embodiments, a machine learning approach may be used to perform image to top-down mapping on a single image. For example, a machine learning algorithm such as deep net may be run on the perspective image as a whole. The machine learning algorithm may identify 2D locations of each pixel (or a subset of them) in the top-down image.

In some implementations, a machine learning approach may be used to perform top-down to image mapping. For example, given a perspective image and a point of interest in the top-down image, the machine learning algorithm may be run on the perspective image for identifying the top-down locations of its points. Then, the point of interest in the top-down image may be mapped to the perspective image.

In some embodiments, mapping the point of interest in the top-down image to the perspective image may involve first selecting the points in the perspective image whose top-down mapping is closest to the interest point. Then, the selected points in the perspective image may be interpolated.

Figure 17:
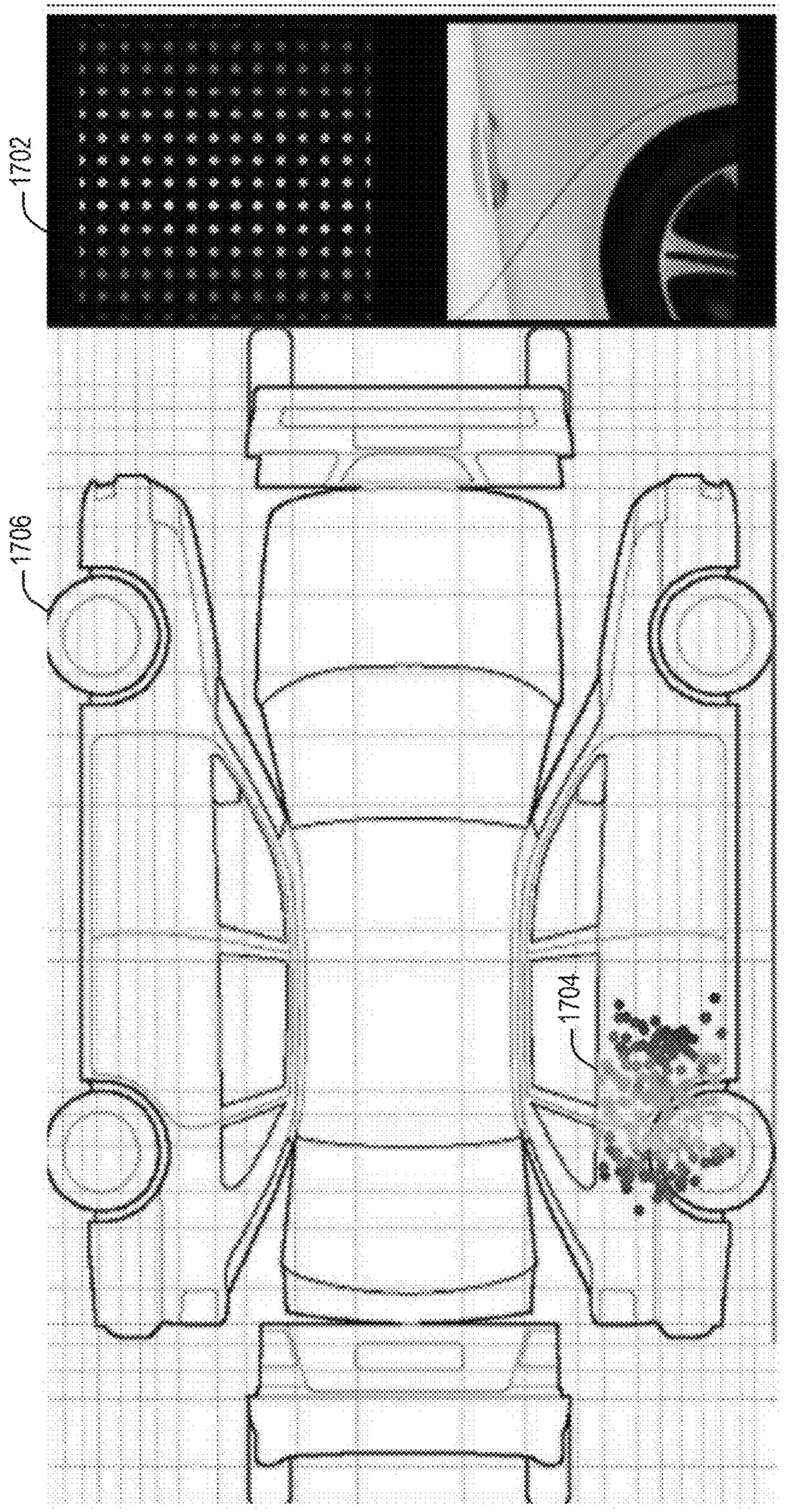
FIG. 17, FIG. 18, and FIG. 19 illustrate images processed in accordance with one or more embodiments.
Figure 18:
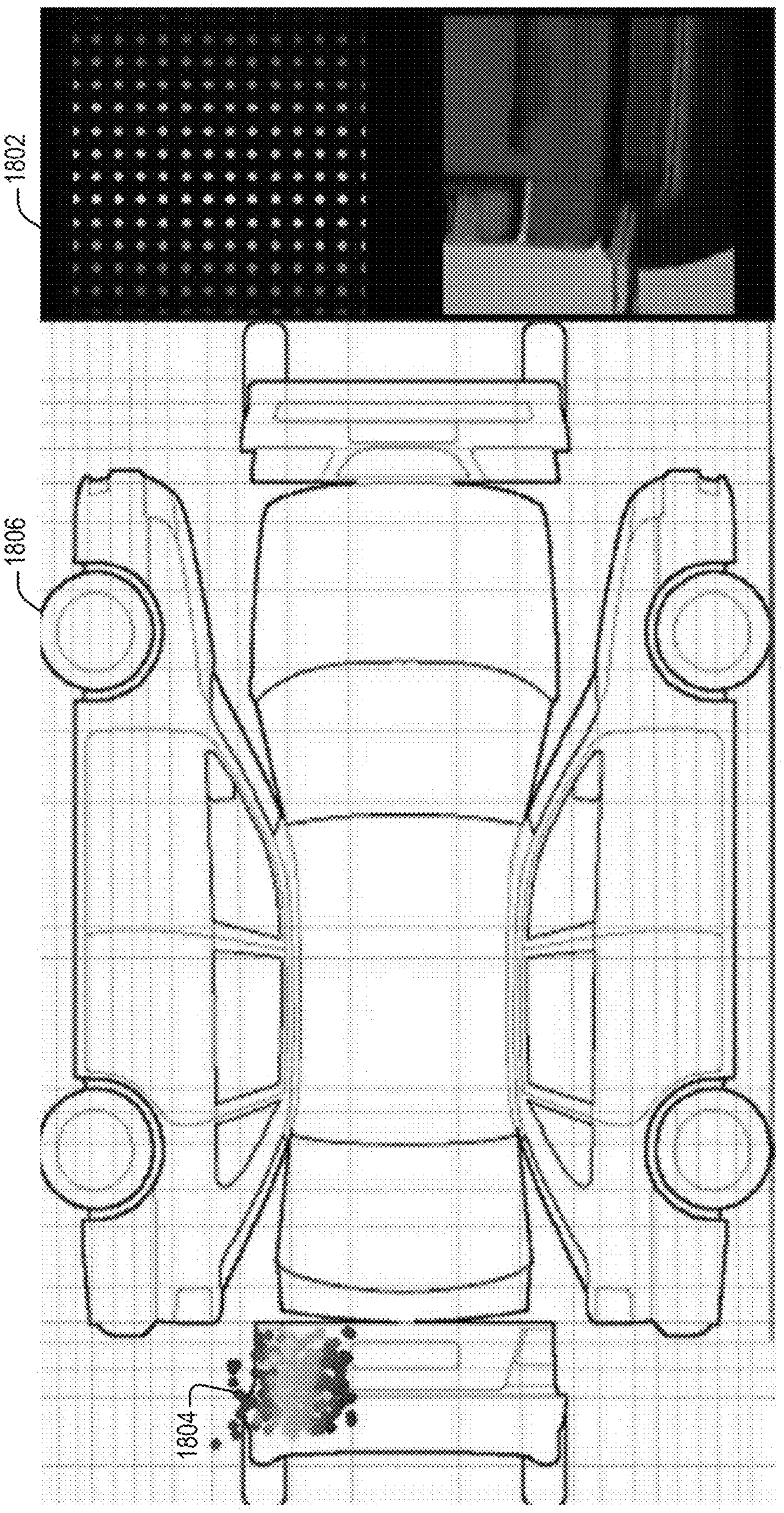
Figure 19:
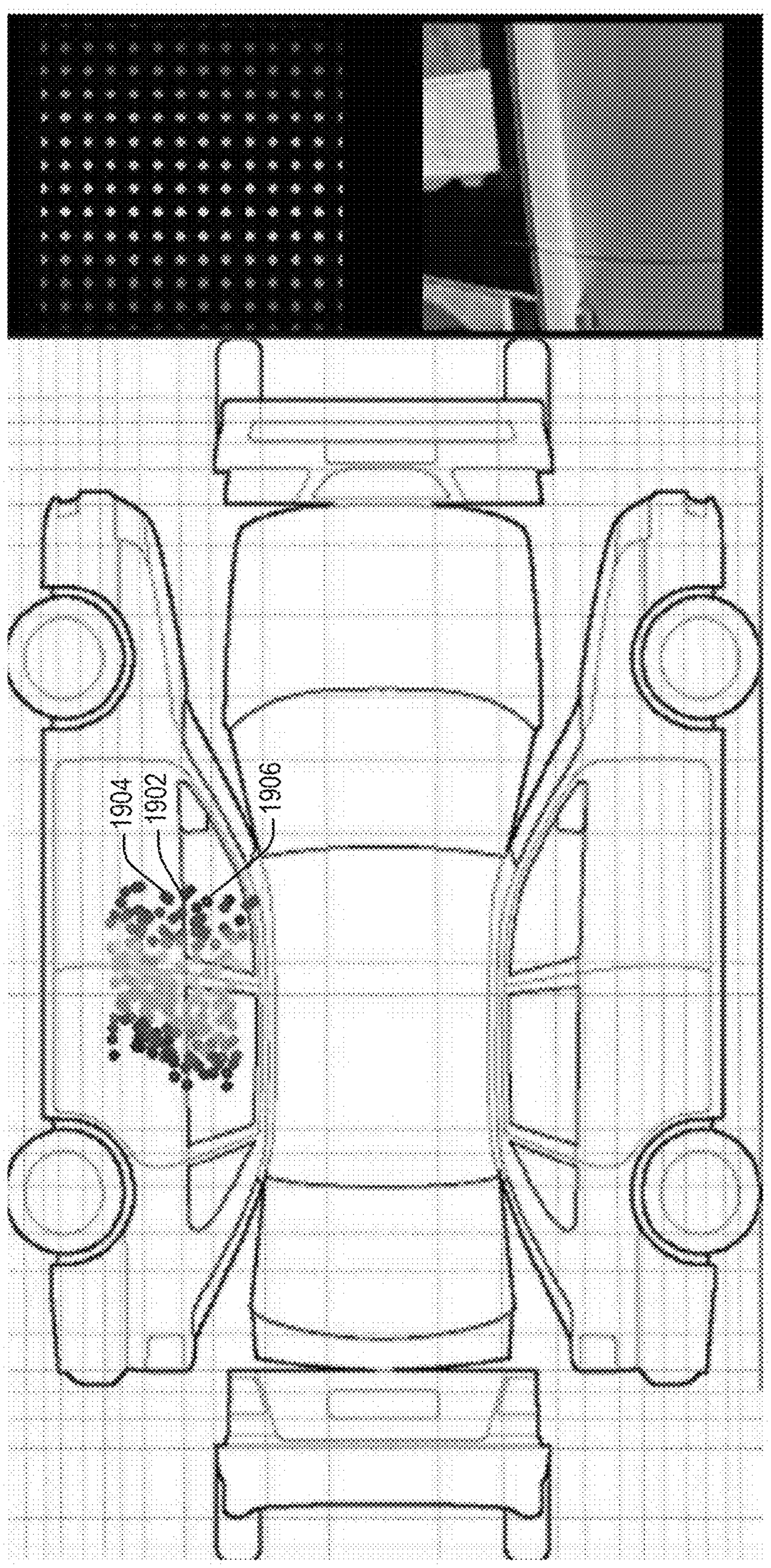

Examples of an image to top-down mapping are shown in FIGS. 17, 18, and 19. The locations of pixels in images of vehicle components are represented by colored dots. These dot locations are mapped from fixed locations 1702 in the perspective view to corresponding locations 1704 on the top-down view 1706. FIG. 18 shows a similar arrangement, with fixed locations 1802 in the perspective view mapped to corresponding locations 1804 in the top-down view 1806. For example, in FIG. 17, the color coding corresponds to the location of the points in the image. A similar procedure may be performed in reverse to map from the top-down view to the perspective view.

In some implementations, a point of interest may be mapped as a weighted average of nearby points. For example, in FIG. 19, the mapping of any particular point, such as 1902, may depend on the value of nearby points, such as 1904 and 1906, drawn from the mapped location in perspective view.

Returning to FIG. 13, as an alternative to operations 1306-1310, the projections of the 3D skeleton joints faces may be used together with the corresponding joints and faces in the top-down view to directly define image transformations that map pixel information from the perspective views into the top-down view and vice versa.

A determination is made at 1316 as to whether to select an additional pixel for analysis. According to various embodiments, analysis may continue until all pixels or a suitable number of pixels are mapped. As discussed with respect to operation 1306, pixels may be analyzed in sequence, in parallel, or in any suitable order.

Optionally, the computed pixel values are aggregated at 1318. According to various embodiments, aggregating the computing pixel values may involve, for example, storing a cohesive pixel map on a storage device or memory module.

According to various embodiments, one or more of the operations shown in FIG. 13 may be omitted. For example, a pixel may be ignored rather than setting it as a background pixel at 1312. In some implementations, one or more of the operations may be performed in an order different from that shown in FIG. 13. For example, pixel values may be aggregated cumulatively during pixel analysis. As another example, pixel values may be determined in parallel.

Figure 14:
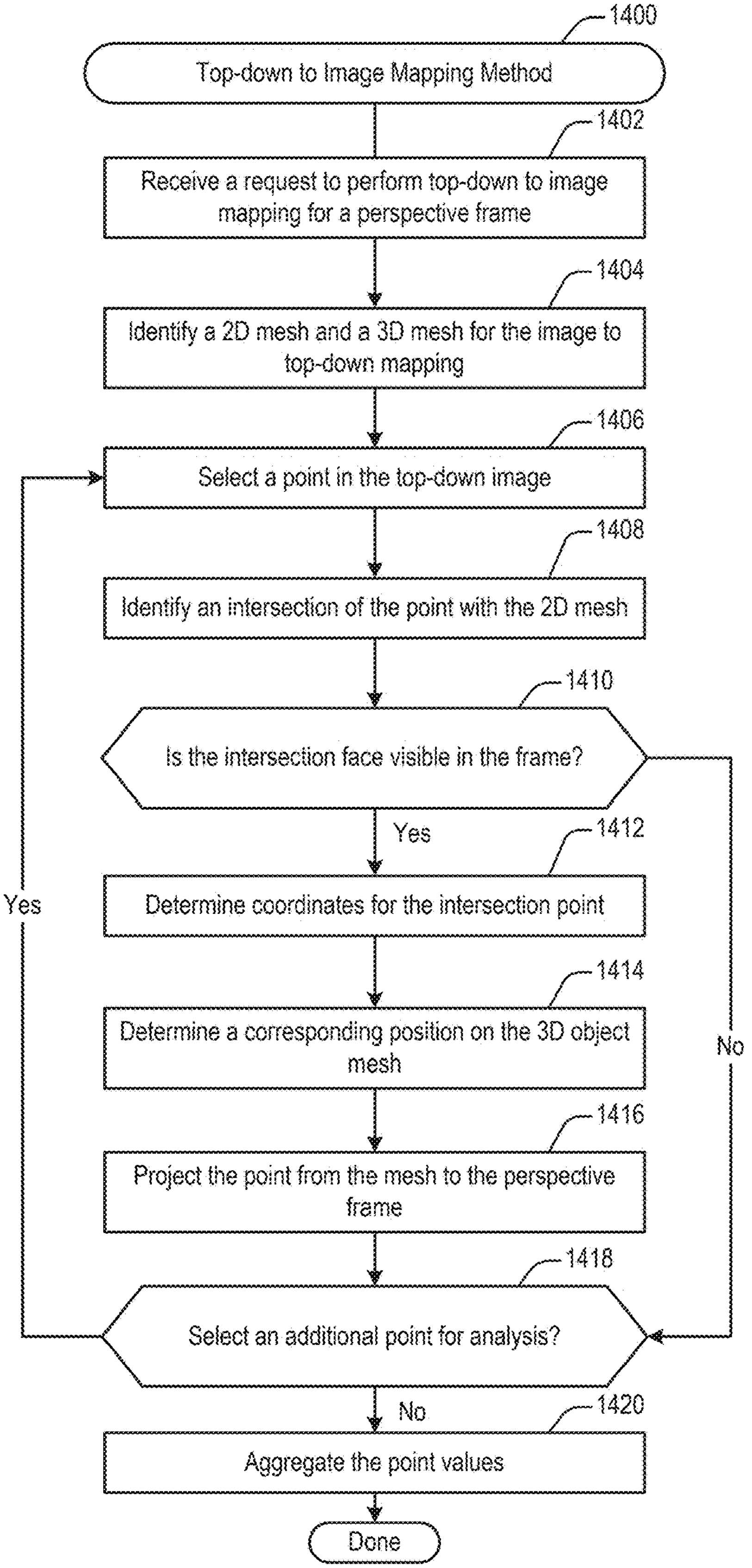
FIG. 14 illustrates one example of a method for performing top-down view to perspective image mapping, performed in accordance with one or more embodiments.

FIG. 14 illustrates one example of a technique 1400 for performing top-down view to perspective image mapping, performed in accordance with one or more embodiments. According to various embodiments, top-down to image mapping refers to finding in a perspective image the position points from a top-down image.

The technique 1400 may be performed on any suitable computing device. For example, the technique 1400 may be performed on a mobile computing device such as a smart phone. Alternately, or additionally, the technique 1400 may be performed on a remote server in communication with a mobile computing device.

At 1402, a request to perform top-down to image mapping is received for a perspective frame. At 1404, a 2D mesh and 3D mesh are identified. for the perspective image to top-down mapping. A 3D mesh is also referred to herein as a 3D skeleton.

At 1406, a point in the top-down image is selected for analysis. According to various embodiments, points may be selected in any suitable order. For example, points may be selected sequentially. As another example, points may be selected based on characteristics such as location. For example, points may be selected within a designated face before moving on to the next face of the top-down image.

At 1408, an intersection of the point with the 2D mesh is identified. A determination is then made at 1410 as to whether the intersection face is visible in the frame. According to various embodiments, the determination may be made in part by checking one or more visibility ranges determined in the preliminary step for the vertices of the intersection face. If the intersection face is not visible, then the point may be discarded.

If the intersection face is visible, then at 1412 coordinates for the intersection point are determined. According to various embodiments, determining coordinate points may involve, for example, extracting barycentric coordinates for the point with respect to the vertices of the intersection face.

A corresponding position on the 3D object mesh is determined at 1414. According to various embodiments, the position may be determined by applying the barycentric coordinates as weights for the vertices of the corresponding intersection face in the object 3D mesh.

The point is projected from the mesh to the perspective frame at 1416. In some implementations, projecting the point may involve evaluating the camera pose and/or the object 3D mesh for the frame. For example, the camera pose may be used to determine an angle and/or position of the camera to facilitate the point projection. At 1418, additional points are selected for analysis. At 1420, point values are aggregated.

Figure 15:
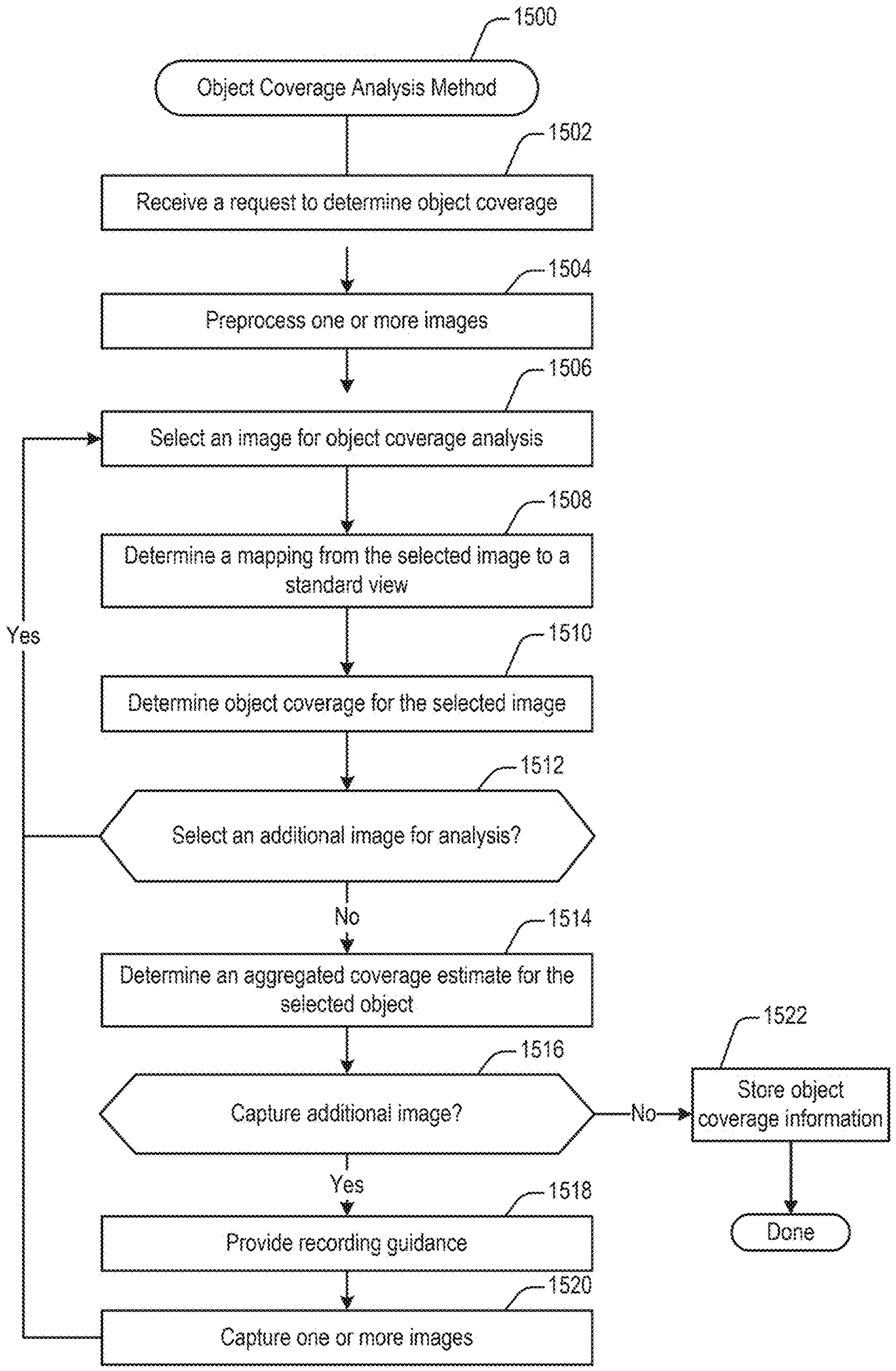
FIG. 15 illustrates a method for analyzing object coverage, performed in accordance with one or more embodiments.

FIG. 15 illustrates a technique for analyzing object coverage, performed in accordance with one or more embodiments. According to various embodiments, the technique 1500 may be performed at a mobile computing device such as a smart phone. The smart phone may be in communication with a remote server. The technique 1500 may be used to detect coverage in a set of images and/or a multi-view representation of any of various types of objects. However, for the purpose of illustration, many examples discussed herein will be described with reference to vehicles.

A request to determine coverage of an object is received at 1502. In some implementations, the request to determine coverage may be received at a mobile computing device such as a smart phone. In particular embodiments, the object may be a vehicle such as a car, truck, or sports utility vehicle.

In some implementations, the request to determine coverage may include or reference input data. The input data may include one or more images of the object captured from different perspectives. Alternatively, or additionally, the input data may include video data of the object. In addition to visual data, the input data may also include other types of data, such as IMU data.

One or more images are pre-processed at 1504. According to various embodiments, one or more images may be pre-processed in order to perform operations such as skeleton detection, object recognition, or 3D mesh reconstruction. For some such operations, input data from more than one perspective view image may be used.

According to various embodiments, a 3D representation of an object such as a 3D mesh, potentially with an associated texture map, may be reconstructed. Alternately, the 3D representation may be a mesh based on a 3D skeleton that has a mapping to the top-down mapping defined. When generating a 3D mesh representation, per-frame segmentation and/or space carving based on estimated 3D poses of the cameras corresponding to those frames may be performed. In the case of a 3D skeleton, such operations may be performed using a neural network that directly estimates a 3D skeleton for a given frame or from a neural network that estimates 2D skeleton joint locations for each frame and then use poses for all camera viewpoints to triangulate the 3D skeleton.

According to various embodiments, a standard 3D model may be used for all objects of the type represented, or may be constructed based on an initial set of perspective view images captured before damage is detected. Such techniques may be used in conjunction with live, pre-recorded, or guided image selection and analysis.

An image is selected for object coverage analysis at 1506. According to various embodiments, the image may be captured at a mobile computing device such as a mobile phone. In some instances, the image may be a view in a multi-view capture. A multi-view capture may include different images of the object captured from different perspectives. For instance, different images of the same object may be captured from different angles and heights relative to the object.

In some implementations, images may be selected in any suitable order. For example, images may be analyzed sequentially, in parallel, or in some other order. As another example, images may be analyzed live as they are captured by a mobile computing device, or in order of their capture.

In particular embodiments, selecting an image for analysis may involve capturing an image. According to various embodiments, capturing the image of the object may involve receiving data from one or more of various sensors. Such sensors may include, but are not limited to, one or more cameras, depth sensors, accelerometers, and/or gyroscopes. The sensor data may include, but is not limited to, visual data, motion data, and/or orientation data. In some configurations, more than one image of the object may be captured. Alternatively, or additionally, video footage may be captured.

A mapping of the selected perspective view image to a standard view is determined at 1508. In some embodiments, the standard view may be determined based on user input. For example, the user may identify a vehicle in general or a car, truck, or sports utility vehicle in particular as the object type. According to various embodiments, object coverage for the selected image is determined at 1510. In particular embodiments, an additional image is selected for analysis at 1512. If there are no additional images, an aggregated coverage estimate or the selected object is determined at 1514. It is then determined if additional images should be captured at 1516. If no additional images need to be captured, object coverage information is stored at 1522. Otherwise, recording guidance may be provided at 1518 to capture one or more images at 1520.

In some implementations, a standard view may be a top-down view of the object that shows the top and the sides of the object. A mapping procedure may then map each point in the image to a corresponding point in the top-down view. Alternately, or additionally, a mapping procedure may map each point in the top-down view to a corresponding point in the perspective view image.

According to various embodiments, a standard view may be determined by performing object recognition. The object type may then be used to select a standard image for that particular object type. Alternately, a standard view specific to the object represented in the perspective view may be retrieved. For example, a top-down view, 2D skeleton, or 3D model may be constructed for the object.

In some embodiments, a neural network may estimate 2D skeleton joints for the image. Then, a predefined mapping may be used to map from the perspective view image to the standard image (e.g., the top-down view). For instance, the predefined mapping may be defined based on triangles determined by the 2D joints.

In some implementations, a neural network may predict a mapping between a 3D model (such as a CAD model) and the selected perspective view image. The coverage may then be mapped to, and aggregated on, the texture map of the 3D model.

Object coverage for the selected image is determined at 1110. According to various embodiments, object coverage may be determined by analyzing the portion of the standard view on which the perspective view image has been mapped.

As another example, an object or top-down image of an object may be divided into a number of components or portions. A vehicle, for instance, may be divided into doors, a windshield, wheels, and other such parts. For each part to which at least a portion of the perspective view image has been mapped, a determination may be made as to whether the part is sufficiently covered by the image. This determination may involve operations such as determining whether any sub-portions of the object component are lacking a designated number of mapped pixels.

In particular embodiments, object coverage may be determined by identifying an area that includes some or all of the mapped pixels. The identified area may then be used to aggregate coverage across different images.

In some embodiments, a grid or other set of guidelines may be overlaid on the top-down view. The grid may be composed of identical rectangles or other shapes. Alternately, the grid may be composed of portions of different sizes. For example, in the image shown in FIG. 18, portions of the object that include greater variation and detail, such as the headlights, are associated with relatively smaller grid portions.

In some implementations, grid density may represent a tradeoff between various considerations. For example, if the grid is too fine, then false negative errors may occur because noise in perspective view image mapping may mean many grid cells are incorrectly identified as not being represented in the perspective view image because no pixels are mapped to the grid cell. However, if the grid is too coarse, then false positive errors may occur because relatively many pixels may map to a large grid portion even if a subportion of the large grid portion is not adequately represented.

In particular embodiments, the size of a grid portion may be strategically determined based on characteristics such as the image resolution, computing device processing power, number of images, level of detail in the object, feature size at a particular object portion, or other such considerations.

In particular embodiments, an indication of coverage evaluation may be determined for the selected image for each grid portion. The indication of coverage evaluation may include one or more components. For example, the indication of coverage evaluation may include a primary value such as a probability value identifying a probability that a given grid portion is represented in the selected image. As another example, the indication of coverage evaluation may include a secondary value such as an uncertainty value or standard error value identifying a degree of uncertainty surrounding the primary value. A value included in an indication of coverage may be modeled as a continuous, discrete, or binary value.

In particular embodiments, an uncertainty value or standard error value may be used to aggregate across different frames. For example, a low degree of confidence about the coverage of the front right door from a particular image would lead to a high uncertainty value, which may lead to a lower weight attributed to the particular image while determining aggregate coverage of the front right door.

In some implementations, the indication of coverage evaluation for a selected image and a given grid portion may be affected by any of a variety of considerations. For example, a given grid portion may be associated with a relatively higher probability of coverage in a selected image if the selected image includes a relatively higher number of pixels that map to the given grid portion. As another example, a pixel may be up-weighted in terms of its effect on coverage estimation if the image or image portion in which the pixel is included is captured from a relatively closer distance to the object. As yet another example, a pixel may be down-weighted in terms of its effect on coverage estimation if the image or image portion in which the pixel is included is captured from an oblique angle. In contrast, a pixel may be up-weighted in terms of its effect on coverage estimation if the image or image portion in which the pixel is included is captured from angle closer to 90 degrees.

In particular embodiments, a probability value and an uncertainty value for a grid may depend on factors such as the number and probability of pixel values assigned to the grid cell. For example, if N pixels end up in a grid cell with their associated scores, the probability of coverage may be modeled as the mean probability score of the N pixels, while the uncertainty value may be modeled as the standard deviation of the N pixels. As another example, if N pixels end up in a grid cell with their associated scores, the probability of coverage may be modeled as N times the mean probability score of the N pixels, while the uncertainty value may be modeled as the standard deviation of the N pixels.

In particular embodiments techniques and mechanisms described herein may be used in conjunction with damage detection analysis. According to various embodiments, damage may be detected by applying a neural network to the selected image. The neural network may identify damage to the object included in the image. In particular embodiments, the damage may be represented as a heatmap. The damage information may identify the damage type and/or severity. For example, the damage information may identify damage as being light, moderate, or severe. As another example, the damage information may identify the damage as a dent or a scratch. Detected damage may then be mapped from the perspective view to the standard view.

According to various embodiments, damage information may be aggregated on the standard view. Aggregating damage on the standard view may involve combining the damage mapped for one perspective view with damage mapped for other perspective view images. For example, damage values for the same component from different perspective view images may be summed, averaged, or otherwise combined.

According to various embodiments, the damage probability information may be determined. Damage probability information may identify a degree of certainty with which detected damage is ascertained. For instance, in a given perspective view it may be difficult to determine with certainty whether a particular image of an object portion depicts damage to the object or glare from a reflected light source. Accordingly, detected damage may be assigned a probability or other indication of certainty. However, the probability may be resolved to a value closer to zero or one with analysis of different perspective views of the same object portion.

Figure 16:
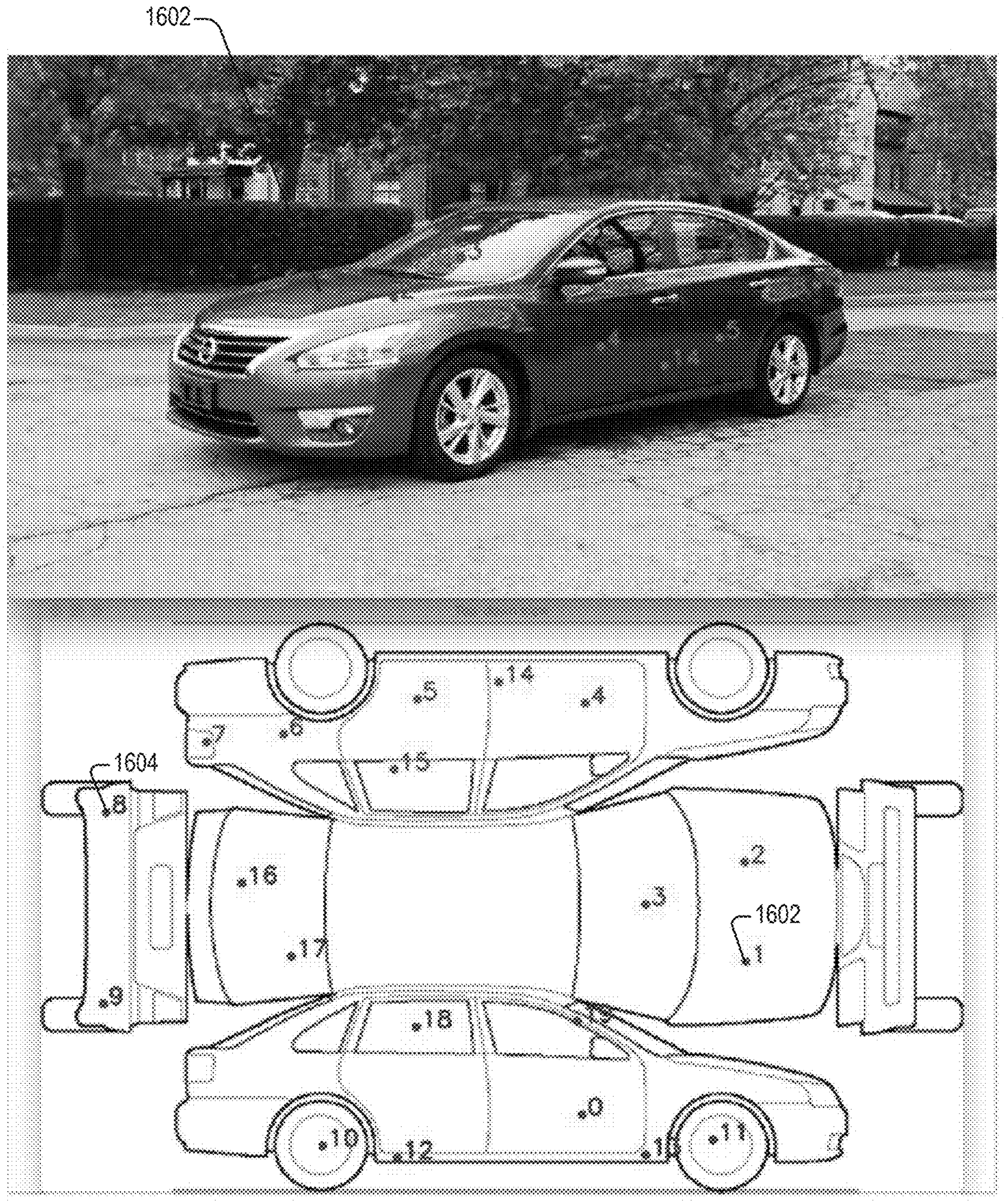
FIG. 16 illustrates an example of the mapping of 20 points from the top-down image of a vehicle to a perspective frame, generated in accordance with one or more embodiments.

FIG. 16 illustrates an example of the mapping of 20 points from the top-down image of a vehicle to a perspective frame. In FIG. 16, points in red such as point 1 1602 are identified as visible in the perspective frame and are thus correctly mapped, while points in blue such as point 8 1604 are not mapped since they are not visible in the perspective view.

FIG. 17 shows a different top-down image that has been mapped to a perspective view image. In FIG. 17, the middle image on the right is the input image, the upper image on the right indicates the color-coded location of each pixel in the input image, and the image on the left shows how the pixels in the input image are mapped onto the top-down view. The lower image on the right shows color coded object components, such as a rear windshield and lower rear door panel.

Various embodiments described herein relate generally to systems and techniques for analyzing the spatial relationship between multiple images and video together with location information data, for the purpose of creating a single representation, a Multiview Interactive Digital Media Representastion (MVIDMR), which eliminates redundancy in the data, and presents a user with an interactive and immersive active viewing experience. According to various embodiments, active is described in the context of providing a user with the ability to control the viewpoint of the visual information displayed on a screen.

In particular example embodiments, augmented reality (AR) is used to aid a user in capturing the multiple images used in a Multiview Interactive Digital Media Representation (MVIDMR). A 3D representation of an object generated using multiple images captured from different perspectives around an object, where the representation is user navigable along at least two different axes is referred to herein as an MVIDMR. For example, a user navigable MVIDMR of a vehicle can be rotated along and X, Y, and Z axes. According to various embodiments, an MVIDMR is generated without constructing a 3D model. For example, a virtual guide can be inserted into live image data from a mobile. The virtual guide can help the user guide the mobile device along a desirable path useful for creating the MVIDMR. The virtual guide in the AR images can respond to movements of the mobile device. The movement of mobile device can be determined from a number of different sources, including but not limited to an Inertial Measurement Unit and image data.

Various aspects also relate generally to systems and techniques for providing feedback when generating a MVIDMR. For example, object recognition may be used to recognize an object present in a MVIDMR. Then, feedback such as one or more visual indicators may be provided to guide the user in collecting additional MVIDMR data to collect a high-quality MVIDMR of the object. As another example, a target view may be determined for a MVIDMR, such as the terminal point when capturing a 360-degree MVIDMR. Then, feedback such as one or more visual indicators may be provided to guide the user in collecting additional MVIDMR data to reach the target view.

Figure 20:
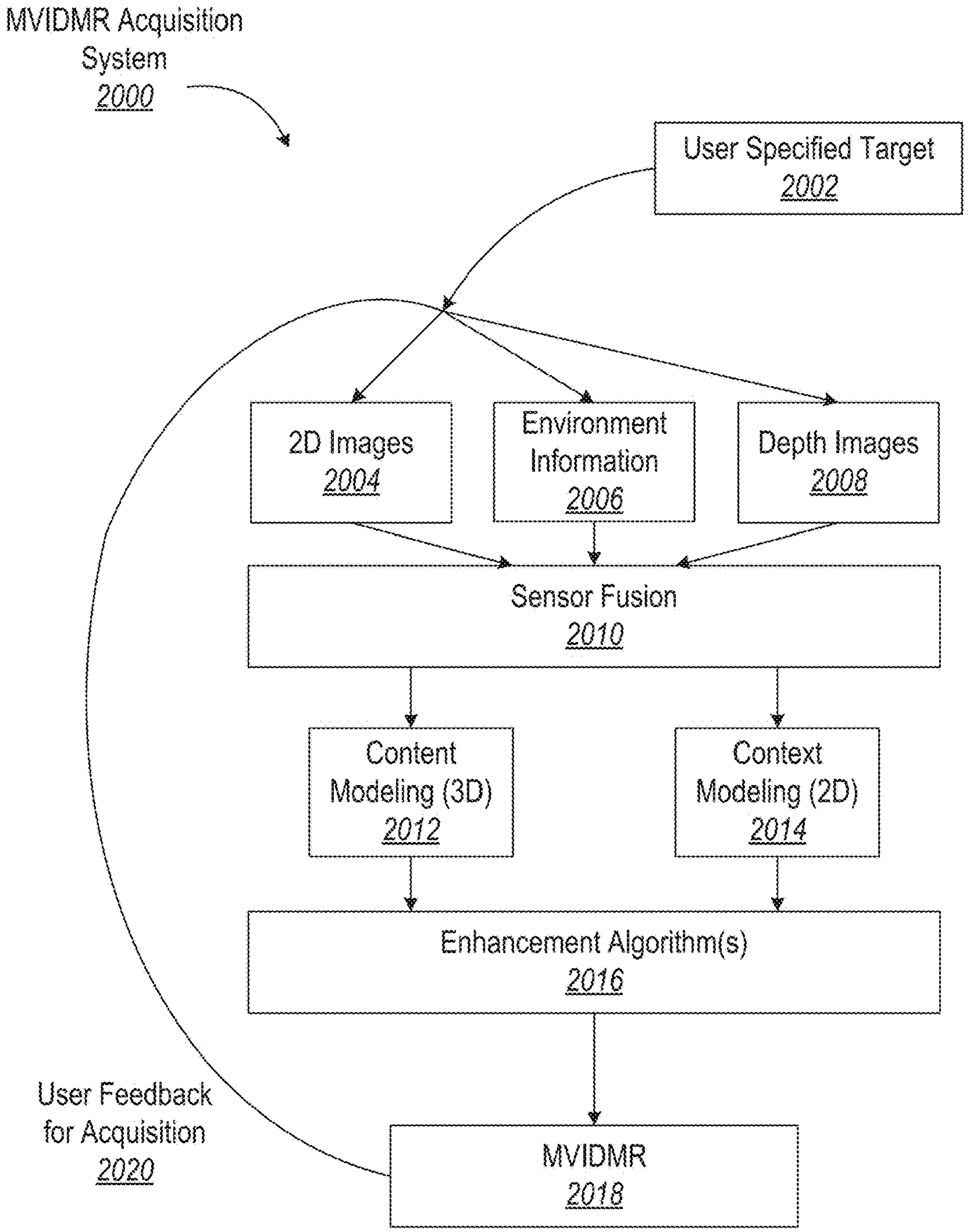
FIG. 20 illustrates one example of a system for generating a MVIDMR, performed in accordance with one or more embodiments.

FIG. 20 shows an example of a MVIDMR acquisition system 2000, configured in accordance with one or more embodiments. The MVIDMR acquisition system 2000 is depicted in a flow sequence that can be used to generate a MVIDMR. According to various embodiments, the data used to generate a MVIDMR can come from a variety of sources.

In particular, data such as, but not limited to two-dimensional (2D) images 2004 can be used to generate a MVIDMR. These 2D images can include color image data streams such as multiple image sequences, video data, etc., or multiple images in any of various formats for images, depending on the application. As will be described in more detail below, during an image capture process, an AR system can be used. The AR system can receive and augment live image data with virtual data. In particular, the virtual data can include guides for helping a user direct the motion of an image capture device.

Another source of data that can be used to generate a MVIDMR includes environment information 2006. This environment information 2006 can be obtained from sources such as accelerometers, gyroscopes, magnetometers, GPS, WiFi, IMU-like systems (Inertial Measurement Unit systems), and the like. Yet another source of data that can be used to generate a MVIDMR can include depth images 2008. These depth images can include depth, 3D, or disparity image data streams, and the like, and can be captured by devices such as, but not limited to, stereo cameras, time-of-flight cameras, three-dimensional cameras, and the like.

In some embodiments, the data can then be fused together at sensor fusion block 2010. In some embodiments, a MVIDMR can be generated a combination of data that includes both 2D images 2004 and environment information 2006, without any depth images 2008 provided. In other embodiments, depth images 2008 and environment information 2006 can be used together at sensor fusion block 2010. Various combinations of image data can be used with environment information at 2006, depending on the application and available data.

In some embodiments, the data that has been fused together at sensor fusion block 2010 is then used for content modeling 2012 and context modeling 2014. The subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 2012 and context modeling 2014 can be generated by combining the image and location information data.

According to various embodiments, context and content of a MVIDMR are determined based on a specified object of interest. In some embodiments, an object of interest is automatically chosen based on processing of the image and location information data. For instance, if a dominant object is detected in a series of images, this object can be selected as the content. In other examples, a user specified target 2002 can be chosen, as shown in FIG. 20. It should be noted, however, that a MVIDMR can be generated without a user-specified target in some applications.

In some embodiments, one or more enhancement algorithms can be applied at enhancement algorithm(s) block 2016. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some embodiments, these enhancement algorithms can be applied to image data after acquisition of the data. In other examples, these enhancement algorithms can be applied to image data during capture of MVIDMR data.

According to various embodiments, automatic frame selection can be used to create a more enjoyable MVIDMR. Specifically, frames are automatically selected so that the transition between them will be smoother or more even. This automatic frame selection can incorporate blur- and over-exposure-detection in some applications, as well as more uniformly sampling poses such that they are more evenly distributed.

In some embodiments, stabilization can be used for a MVIDMR in a manner similar to that used for video. In particular, keyframes in a MVIDMR can be stabilized for to produce improvements such as smoother transitions, improved/enhanced focus on the content, etc. However, unlike video, there are many additional sources of stabilization for a MVIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some embodiments, depth information, if available, can be used to provide stabilization for a MVIDMR. Because points of interest in a MVIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. According to various embodiments, the content can stay relatively stable/visible even when the context changes.

According to various embodiments, computer vision techniques can also be used to provide stabilization for MVIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a MVIDMR is often focused on a particular object of interest, a MVIDMR can be content-weighted so that the object of interest is maximally stabilized in some examples.

Another way to improve stabilization in a MVIDMR includes direct selection of a region of a screen. For instance, if a user taps to focus on a region of a screen, then records a convex MVIDMR, the area that was tapped can be maximally stabilized. This allows stabilization algorithms to be focused on a particular area or object of interest.

In some embodiments, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various embodiments, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a MVIDMR in some embodiments. In other embodiments, view interpolation can be applied during MVIDMR generation.

In some embodiments, filters can also be used during capture or generation of a MVIDMR to enhance the viewing experience. Just as many popular photo sharing services provide aesthetic filters that can be applied to static, two-dimensional images, aesthetic filters can similarly be applied to surround images. However, because a MVIDMR representation is more expressive than a two-dimensional image, and three-dimensional information is available in a MVIDMR, these filters can be extended to include effects that are ill-defined in two dimensional photos. For instance, in a MVIDMR, motion blur can be added to the background (i.e. context) while the content remains crisp. In another example, a drop-shadow can be added to the object of interest in a MVIDMR.

According to various embodiments, compression can also be used as an enhancement algorithm block 2016. In particular, compression can be used to enhance user-experience by reducing data upload and download costs. Because MVIDMRs use spatial information, far less data can be sent for a MVIDMR than a typical video, while maintaining desired qualities of the MVIDMR. Specifically, the IMU, keypoint tracks, and user input, combined with the view interpolation described above, can reduce the amount of data that must be transferred to and from a device during upload or download of a MVIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MVIDMR 2018 is generated after any enhancement algorithms are applied. The MVIDMR can provide a multi-view interactive digital media representation. According to various embodiments, the MVIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR representation, and provide the capability for use in various applications. For instance, MVIDMRs can be used to enhance various fields such as e-commerce, visual search, 3D printing, file sharing, user interaction, and entertainment.

According to various example embodiments, once a MVIDMR 2018 is generated, user feedback for acquisition 2020 of additional image data can be provided. In particular, if a MVIDMR is determined to need additional views to provide a more accurate model of the content or context, a user may be prompted to provide additional views. Once these additional views are received by the MVIDMR acquisition system 2000, these additional views can be processed by the system 2000 and incorporated into the MVIDMR.

Figure 21:
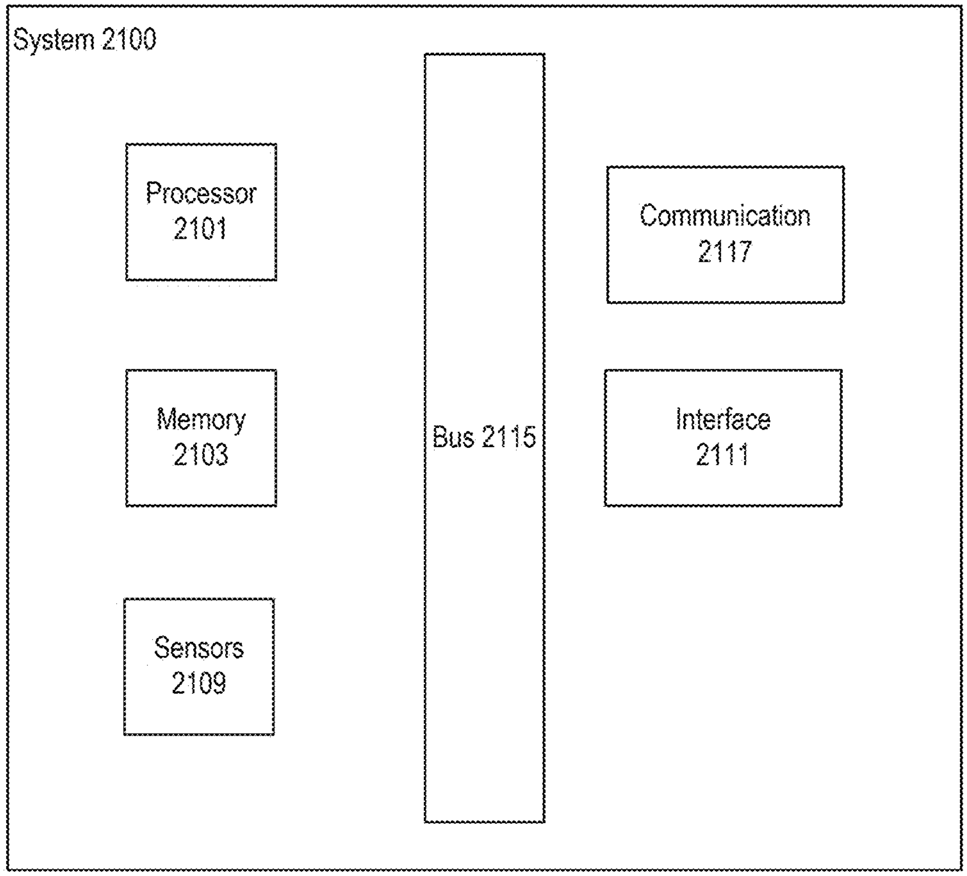
FIG. 21 illustrates a particular example of a computer system configured in accordance with various embodiments.

With reference to FIG. 21, shown is a particular example of a computer system that can be used to implement particular examples. For instance, the computer system 2100 can be used to provide MVIDMRs according to various embodiments described above. According to various embodiments, a system 2100 suitable for implementing particular embodiments includes a processor 2101, a memory 2103, an interface 2111, a communication interface 2117, and a bus 2115 (e.g., a PCI bus).

The system 2100 can include one or more sensors 2109, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command. Various implementations may also be stored on non-transitory computer readable media such as discs, flash memory, solid state drives, etc.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. In some examples, a high speed camera is one that can capture images at 120 frames per second or more. For example, a pixel array size can be 512×512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512×512 pixel array with RGB values represented by 24 bits and at frame rate of 24 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512×512 pixels, it can be interpolated to a 256×256 pixel array using a technique such as pixel averaging and then the transformation can be applied to the 256×256 pixel array. The transformed video data can output and/or stored at the lower 256×256 pixel resolution. Alternatively, the transformed video data, such as with a 256×256 pixel resolution, can be interpolated to a higher resolution, such as its native resolution of 512×512 pixels, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

The interface 2111 may include separate input and output interfaces, or may be a unified interface supporting both operations. Examples of input and output interfaces can include displays, audio devices, cameras, touch screens, buttons and microphones. When acting under the control of appropriate software or firmware, the processor 2101 is responsible for such tasks such as optimization. Various specially configured devices can also be used in place of a processor 2101 or in addition to processor 2101, such as graphical processor units (GPUs). The complete implementation can also be done in custom hardware. The interface 2111 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 2100 uses memory 2103 to store data and program instructions and maintained a local side cache. The program instructions may control the operation of an operating system and/or one or more applications, for example. The memory or memories may also be configured to store received metadata and batch requested metadata.

The system 2100 can be integrated into a single device with a common housing. For example, system 2100 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 2100 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

The invention claimed is:

1. A vehicle tunnel, comprising:

a vehicle tunnel entrance area;

a vehicle tunnel exit area;

a plurality of cameras configured to capture images of a vehicle passing through the vehicle tunnel; and a variably switched lighting panel comprising:

a plurality of light emitting diodes (LEDs) in striped format, the plurality of LEDs comprising a first plurality of LEDs and a second plurality of LEDs in alternating rows;

a microcontroller operable to control the first plurality of LEDs and the second plurality of LEDS in multiple modes including a first mode when the first plurality of LEDs and the second plurality of LEDs are both on and a second mode when the first plurality of LEDs are on and the second plurality of LEDs are off;

a diffuser placed in front of the LEDs to emit more uniform lighting from the variably switched lighting panel; and a plurality of lighting barriers between the first plurality of LEDs and the second plurality of LEDs, so that a plurality of stripes are dark when particular rows of LEDs are off;

wherein the plurality of cameras are configured to capture a first plurality of vehicle surface images when illuminated by the variably switched lighting panel, wherein the first plurality of vehicle surface images are analyzed to detect vehicle imperfections.

2. The vehicle tunnel of claim 1, wherein the microcontroller is operable to control the first plurality of LEDS and the second plurality of LEDS in a third mode when the first plurality of LEDS and the second plurality of LEDS are both off.

3. The vehicle tunnel of claim 1, wherein the plurality of lighting barriers are opaque lighting barriers separating strips of LEDS.

4. The vehicle tunnel of claim 1, wherein the first plurality of LEDS and the second plurality of LEDS are switched to selected colors to contrast against a color of the vehicle.

5. The vehicle tunnel of claim 4, wherein the first plurality of LEDS is selected to be a complementary color to the color of the vehicle.

6. The vehicle tunnel of claim 1, wherein images captured are used to generate a Multiview Interactive Digital Media Representation (MVIDMR).

7. The vehicle tunnel of claim 6, wherein a plurality of MVIDMRs are generated for a plurality of different components of the vehicle.

8. The vehicle tunnel of claim 7, wherein each of the plurality of MVIDMRs is user navigable along at least two different axes.

9. The vehicle tunnel of claim 8, wherein the plurality of MVIDMRs are generated for a plurality of vehicle components including damaged components.

10. The vehicle tunnel of claim 9, wherein the damaged components are navigable along at least two different axes.

11. The vehicle tunnel of claim 1, wherein images illuminated by the variably switched lighting panel operating in a uniform lighting panel mode are used to detect damage to a first component of the vehicle.

12. The vehicle tunnel of claim 11, wherein images illuminated by the variably switched lighting panel operating in a striped lighting panel mode are used to analyze an extent of damage to the first component of the vehicle.

13. The vehicle tunnel of claim 11, wherein capture of additional images is triggered if damage is detected.

14. The vehicle tunnel of claim 1, wherein the variably switched lighting panel includes a plurality of strips of color LEDs operating in a plurality of modes.

15. The vehicle tunnel of claim 1, wherein the variably switched lighting panel includes a plurality of strips of color LEDs operating in a plurality of modes including an all on mode, an all off mode, and a striped mode.

* * * * *